United States Patent
Schreiber et al.

(10) Patent No.: US 11,958,590 B2
(45) Date of Patent: *Apr. 16, 2024

(54) SYSTEM AND A METHOD FOR A BATTERY POWER MANAGEMENT SYSTEM FOR AN ELECTRIC AIRCRAFT

(71) Applicant: BETA AIR, LLC, South Burlington, VT (US)

(72) Inventors: Stuart Denson Schreiber, South Burlington, VT (US); Nicholas Moy, South Burlington, VT (US); Collin Freiheit, South Burlington, VT (US)

(73) Assignee: Beta Air, LLC, South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,366

(22) Filed: Mar. 31, 2023

(65) Prior Publication Data

US 2023/0234698 A1 Jul. 27, 2023

Related U.S. Application Data

(63) Continuation-in-part of application No. 17/515,124, filed on Oct. 29, 2021, now Pat. No. 11,679,867, and
(Continued)

(51) Int. Cl.
*B64C 13/50* (2006.01)
*B64C 13/16* (2006.01)
(Continued)

(52) U.S. Cl.
CPC ............ *B64C 13/16* (2013.01); *B64C 13/503* (2013.01); *H04W 4/40* (2018.02); *H04W 72/569* (2023.01); *B64C 29/0033* (2013.01)

(58) Field of Classification Search
CPC ... B64C 13/503; B64C 13/16; B64C 29/0033; B64D 27/24; H04W 72/1242;
(Continued)

(56) References Cited

U.S. PATENT DOCUMENTS 8,831,816 B2 * 9/2014 Kwon ................... B60L 3/0069
701/29.2
9,527,588 B1 * 12/2016 Rollefstad .............. B64D 41/00
(Continued)

OTHER PUBLICATIONS

Clarke et al., X-57 power and command system design, 2017, IEEE, p. 393-400 (Year: 2017).*
(Continued)

*Primary Examiner* — McDieunel Marc
(74) *Attorney, Agent, or Firm* — Lee & Hayes P.C.

(57) ABSTRACT

A system and a method for a battery power management system for an electric aircraft is disclosed. The system includes at least a flight component of an electric aircraft, at least a battery, wherein the at least a battery is configured power the at least a flight component of the electric aircraft, at least a sensor communicatively connected to the at least a battery and a controller communicatively connected to the at least a sensor. The controller is configured to receive sensor data from the at least a sensor, identify a battery status as a function of the sensor data and a battery threshold, and control the power from the at least a battery to the at least a flight component of the electric aircraft as a function of the battery status, further comprising reducing a torque to the at least a flight component.

20 Claims, 10 Drawing Sheets

Related U.S. Application Data a continuation-in-part of application No. 18/114,478, filed on Feb. 27, 2023, said application No. 17/515,124 is a continuation of application No. 17/349,631, filed on Jun. 16, 2021, which is a continuation-in-part of application No. 17/197,427, filed on Mar. 10, 2021, now Pat. No. 11,142,333, said application No. 18/114,478 is a continuation of application No. 17/524,901, filed on Nov. 12, 2021, now Pat. No. 11,623,738.

(51) Int. Cl.
*H04W 4/40* (2018.01)
*H04W 72/566* (2023.01)
*B64C 29/00* (2006.01)

(58) Field of Classification Search
CPC ... H04W 4/40; H01M 10/48; H01M 10/0481; H01M 10/425; H01M 2220/20; H01M 2010/4278; B60L 58/16; B60L 50/64; B60L 58/12; B60L 3/0046; B60L 2250/16; B60L 2240/10; B60L 2200/10; H02J 7/0048; Y02T 10/70
See application file for complete search history.

(56) References Cited

U.S. PATENT DOCUMENTS

| | | | |
|---|---|---|---|
| 9,938,011 B2* | 4/2018 | Rollefstad | B64C 39/024 |
| 9,958,874 B2 | 5/2018 | Yu | |
| 10,281,890 B1 | 5/2019 | Kroo | |
| 10,479,223 B2* | 11/2019 | Demont | B64F 5/60 |
| 10,589,635 B1* | 3/2020 | Solodovnik | H02J 7/1415 |
| 10,826,137 B2 | 11/2020 | Zheng | |
| 11,142,333 B1 | 10/2021 | Richter | |
| 11,198,519 B1* | 12/2021 | Seeley | B64F 1/31 |
| 11,349,326 B2* | 5/2022 | Krieg | B60L 50/50 |
| 11,443,569 B1 | 9/2022 | Churchill | |
| 11,447,269 B2* | 9/2022 | Seeley | B64F 1/31 |
| 11,623,738 B1* | 4/2023 | Auerbach | B64C 13/16 701/4 |
| 11,679,867 B2 | 6/2023 | Giroux | |
| 2016/0244144 A1* | 8/2016 | Karem | B64C 11/30 |
| 2022/0163978 A1* | 5/2022 | Moon et al. | B64C 13/16 701/4 |
| 2022/0258647 A1* | 8/2022 | Joao | H01M 10/46 |
| 2022/0407159 A1 | 12/2022 | Schreiber | |
| 2023/0302961 A1* | 9/2023 | Lohe | B64D 27/24 |

OTHER PUBLICATIONS

Maldonado et al., Power Management and Distribution System for a More-Electric Aircraft (MADMEL)-program status, 1997, IEEE, p. 274-279 (Year: 1997).*
Fugaro et al., Aeronautical hybrid propulsion for More Electric Aircraft: a case of study, 2018, IEEE, p. 1-6 (Year: 2018).*
Lee et al., Active power management system for an unmanned aerial vehicle powered by solar cells, a fuel cell, and batteries, 2014, IEEE, p. 3167-3177 (Year: 2014).*
Maldonado et al., Power management and distribution system for a more-electric (MADMEL), 1999, IEEE, p. 3-8 (Year: 1999).*
Kulkarni et al., On-Board Battery Monitoring and Prognostics for Electric-Propulsion Aircraft, 2018, IEEE, p. 1-12 (Year: 2018).*
Liu et al., A multi-module battery system based on MODBUS for a hybrid aircraft, 2012, IEEE, p. 1-6 (Year: 2012).*
Abu-Rub et al., Power Electronics for More Electric Aircraft, 2014, IEEE, p. 365-386 (Year: 2014).*
Donovan, "Development of a Flight Controller for the Delta Space Research Vehicle", IEEE, 1960, pp. 406-411.
Hon-Qi, et al., "A Design of Flight Control System for Four-Rotor Micro Aerial Vehicle", 2015, IEEE, pp. 1447-1451.
Hossein, et al., "The Design, Implementation, and Stability Analysis of a Human-Inspired Dome-Tethered Robot", IEEE, 2014, pp. 648-653.
Liu, et al., "An L1 Adaptive Roll and Pitch Angle Controller for Quadrotors", IEEE, 2016, pp. 2437-2478.
Wang, et al., "Design and Experiment of Rudder Load Simulator for High Dynamic Aircraft", IEEE, 2009, p. 2573-2577.
Zhang, et al., "Insulators Recognition for 220kv/330kv High-voltage Live-line Cleaning", IEEE, 2006, pp. 1-4.

* cited by examiner

SYSTEM AND A METHOD FOR A BATTERY POWER MANAGEMENT SYSTEM FOR AN ELECTRIC AIRCRAFT

CROSS-REFERENCE TO RELATED APPLICATIONS

This application is a continuation-in-part of Non-provisional application Ser. No. 17/515,124 filed on Oct. 29, 2021 and titled "SYSTEM AND METHOD FOR FLIGHT CONTROL IN ELECTRIC AIRCRAFT" (App. '124) and Non-provisional application Ser. No. 18/114,478 filed on Feb. 27, 2023 and titled "SYSTEM AND METHOD FOR THE PRIORITIZATION OF FLIGHT CONTROLS IN AN ELECTRIC AIRCRAFT," (App. '478) the entirety of both of which are incorporated in this disclosure by reference. App. '124 is a continuation of Non-provisional application Ser. No. 17/349,631 filed on Jun. 16, 2021 and titled "SYSTEM AND METHOD FOR FLIGHT CONTROL IN ELECTRIC AIRCRAFT," which is a continuation-in-part of Non-provisional application Ser. No. 17/197,427 filed on Mar. 10, 2021 and titled "SYSTEM AND METHOD FOR FLIGHT CONTROL IN ELECTRIC AIRCRAFT," the entirety of each of which is incorporated in this disclosure by reference. App. '478 is a continuation of Non-provisional application Ser. No. 17/524,901 filed on Nov. 12, 2021 and titled "SYSTEM AND METHOD FOR THE PRIORITIZATION OF FLIGHT CONTROLS IN AN ELECTRIC AIRCRAFT," the entirety of which is incorporated in this disclosure by reference.

FIELD OF THE INVENTION

The present invention generally relates to the field of battery management systems. In particular, the present invention is directed to a system and a method for a battery power management system for an electric aircraft.

BACKGROUND

Batteries of electric aircrafts may experience a thermal runaway and/or electrical insulation breakdown when the batteries get overly heated. It is crucial to prevent the batteries from getting overly heated. Existing solutions to this problem are not sufficient.

SUMMARY OF THE DISCLOSURE

In an aspect, a system for a battery power management system for an electric aircraft is disclosed. The system includes at least a flight component of an electric aircraft, at least a battery, wherein the at least a battery is configured power the at least a flight component of the electric aircraft, at least a sensor communicatively connected to the at least a battery and a controller communicatively connected to the at least a sensor. The controller is configured to receive sensor data from the at least a sensor, identify a battery status as a function of the sensor data and a battery threshold, and control the power of the at least a battery to the at least a flight component of the electric aircraft as a function of the battery status.

In another aspect, a method for a battery power management system for an electric aircraft is disclosed. The method includes receiving, using a controller, sensor data from at least a sensor communicatively connected to at least a battery configured to provide a power to at least a flight component of an electric aircraft. The method includes identifying, using the controller, a battery status as a function of the sensor data and a battery threshold. The method includes controlling, using the controller, the power of the at least a battery to the at least a flight component of the electric aircraft as a function of the battery status.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a system for a battery power management system for an electric aircraft. The system includes at least a flight component of an electric aircraft, at least a battery, wherein the at least a battery is configured power the at least a flight component of the electric aircraft, at least a sensor communicatively connected to the at least a battery and a controller communicatively connected to the at least a sensor. The controller is configured to receive sensor data from the at least a sensor, identify a battery status as a function of the sensor data and a battery threshold, and control the power of the at least a battery to the at least a flight component of the electric aircraft as a function of the battery status.

Aspects of the present disclosure can be used to prevent thermal runway and/or electrical insulation breakdown. This is so, at least in part, because a system for a battery power management system may reduce a power of at least a battery when the at least a battery gets overly heated.

Aspects of the present disclosure allow for reducing a power of at least a battery to a flight component of an electric aircraft. Exemplary embodiments illustrating aspects of the present disclosure are described below in the context of several specific examples.

Figure 1:
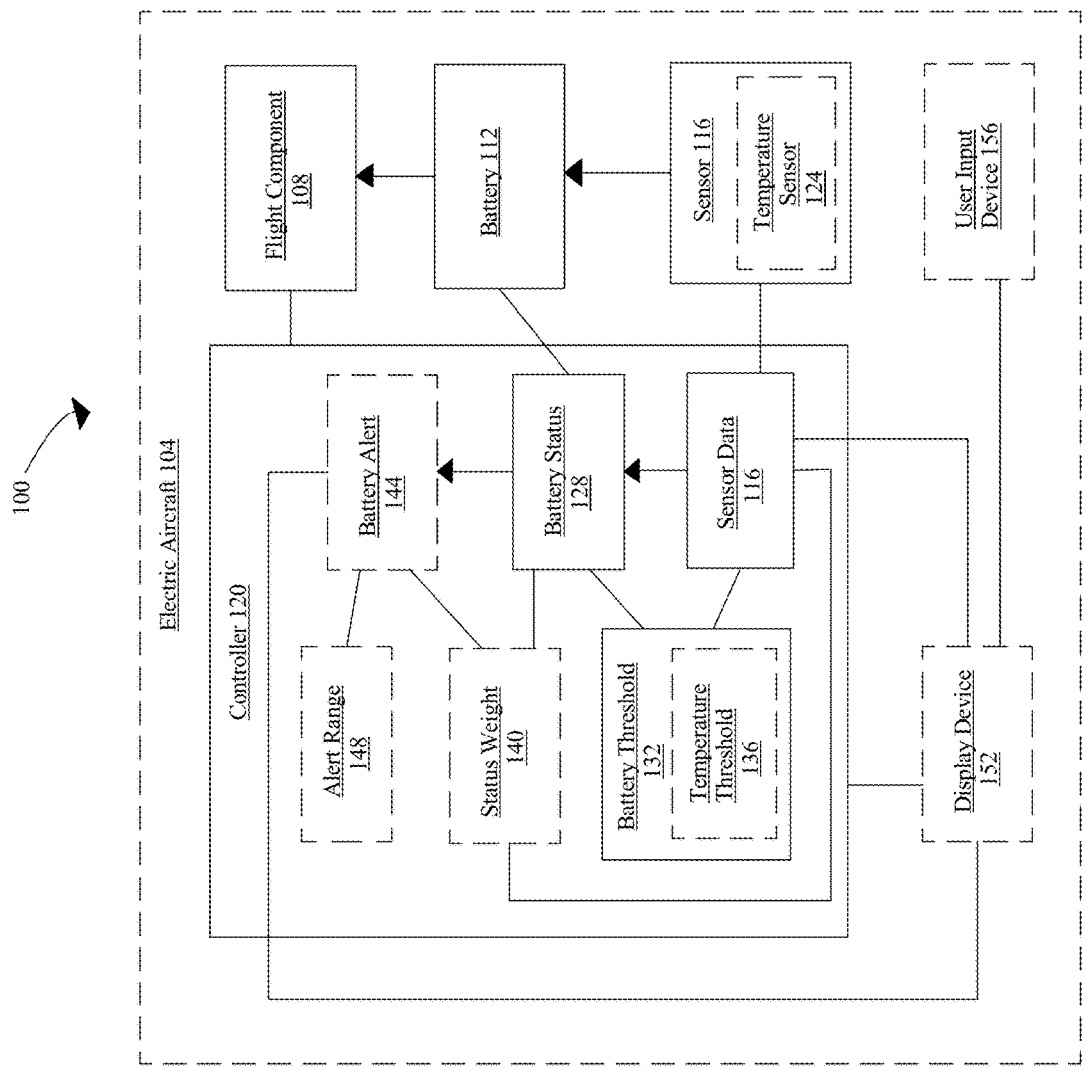
FIG. 1 is a block diagram of an exemplary embodiment of a system for a battery power management system for an electric aircraft.

Referring now to FIG. 1, an exemplary embodiment of system 100 for a battery management system for an electric aircraft is illustrated. For the purposes of this disclosure, an "electric aircraft" is an electrically powered aircraft. The electric aircraft 104 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. In an embodiment, the electric aircraft 104 may include electric vertical takeoff and landing (eVTOL) aircraft. A "vertical take-off and landing aircraft," as used in this disclosure, is an aircraft that can hover, take off, and land vertically. In another embodiment, the electric aircraft 104 may include an electric conventional takeoff and landing (eCTOL) aircraft. For the purposes of this disclosure, a "conventional take-off and landing aircraft" is an aircraft taking off and landing horizontally from a conventional length runway in the distance. In another embodiment, the electric aircraft may include an electric short takeoff and landing (eSTOL) aircraft. For the purposes of this disclosure, a "short takeoff and landing aircraft" is an aircraft that needs a shorter minimum horizontal distance to accelerate in order to ascend into the air than typical fixed wing types of aircrafts. Additionally, the electric aircraft disclosed herein is further described in detail in FIG. 8.

With continued reference to FIG. 1, system 100 includes at least a flight component 108. For the purposes of this disclosure, a "flight component" is a device on an electric aircraft that is used to affect the electric aircraft's flight through the air. The at least a flight component 108 may include energy sources, power sources, thrust components, lift components, pusher components, control links to one or more elements, fuses, and/or mechanical couplings used to drive and/or control any other flight component. The at least a flight component 108 may include an electric motor that operates to move one or more flight control components, to drive one or more propulsors, or the like. An "electric motor," for the purposes of this disclosure, is a device that converts electrical energy into mechanical energy. The electric motor may be driven by direct current (DC) electric power; for instance, a motor may include a brushed DC motor or the like. The electric motor may be driven by electric power having varied or reversing voltage levels, such as alternating current (AC) power as produced by an alternating current generator and/or inverter, or otherwise varying power, such as produced by a switching power source. The electric motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and the like. Additionally without limitation, the at least a flight component 108 disclosed herein may be consistent with a flight component found in U.S. patent application Ser. No. 17/526,399, filed on Nov. 15, 2021, and entitled "SYSTEMS AND METHODS FOR CONTROLLING A FLIGHT BOUNDARY OF AN AIRCRAFT," the entirety of which is incorporated as a reference.

With continued reference to FIG. 1, an electric motor may include a stator. For the purposes of this disclosure, a "stator" is a stationary portion of an electric motor. Electric motor may include a rotor. A "rotor," for the purposes of this disclosure, is a rotating portion of an electric motor. As a non-limiting example, the electric motor may convert electrical energy into mechanical energy by rotating rotor. In some embodiments, the rotor may include a circular cross-section. In some embodiments, the rotor may include a hollow central portion.

With continued reference to FIG. 1, in some embodiments, an electric motor may include a plurality of electric motors. In some embodiments, electric motor may include two electric motors. As a nonlimiting example, electric motor may include a first electric motor and a second electric motor. In some embodiments, first electric motor may be consistent with electric motor as described throughout this disclosure. In some embodiments, second electric motor may be consistent with electric motor as described throughout this disclosure. First electric motor may comprise a stator consistent with the stator of electric motor. Second electric motor may comprise a stator consistent with the stator of electric motor. In some embodiments, first electric motor and second electric motor may each include a rotor. The rotor of first electric motor and second electric motor may be consistent with rotor of electric motor. In some embodiments, first electric motor and second electric motor may include a shared rotor. Shared rotor may be consistent with rotor of electric motor. In some embodiments, the rotor of first electric motor may be a first rotor and/or the rotor of second electric motor may be a second rotor. In some embodiments, first electric motor and second electric motor may each include a sprag clutch. Sprag clutch may allow first electric motor to rotate the shaft even if second electric motor is not functioning, or vice versa. As non-limiting examples, a sprag clutch may be located between the first rotor and shaft and/or the second rotor and shaft. In some embodiments, electric motor may be consistent with disclosure of motor in U.S. patent application Ser. No. 17/563,498, filed on Dec. 28, 2021 and titled "AN ELECTRIC AIRCRAFT LIFT MOTOR WITH AIR COOLING", which is incorporated by reference herein in its entirety.

With continued reference to FIG. 1, in some embodiments, at least a flight component 108 may include an energy source. The energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). The energy source may also include a battery pack, a battery, a battery cell, or a plurality of battery cells connected in series into a module and each module connected in series or in parallel with other modules. Configuration of the energy source containing connected modules may be designed to meet an energy or power requirement and may be designed to fit within a designated footprint in an electric aircraft 104.

Still referring to FIG. 1, in an embodiment, at least a flight component 108 may be mechanically coupled to an electric aircraft 104. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an aircraft. Further, in an embodiment, mechanical coupling may be used to join two pieces of rotating aircraft components.

Still referring to FIG. 1, in some embodiments, at least a flight component 108 may include at least a lift component and at least a pusher component. For the purposes of this disclosure, a "pusher component" is a component that pushes and/or thrusts an aircraft through a medium. The pusher component may include a propulsor, a propeller, a blade, a motor, a rotor, a rotating element, an aileron, a rudder, arrangements thereof, combinations thereof, and the like. As a non-limiting example, pusher component may include a pusher propeller, a paddle wheel, a pusher motor, a pusher propulsor, and the like. Additionally, or alternatively, pusher flight component may include a plurality of pusher flight components. Each pusher component, when a plurality is present, of the plurality of flight components 108 may be configured to produce, in an embodiment, substantially forward and/or horizontal thrust such that the aircraft moves forward. The pusher component may be configured to produce a forward thrust. As a non-limiting example, forward thrust may include a force to force aircraft to in a horizontal direction along the longitudinal axis. As a further non-limiting example, pusher component may twist and/or rotate to pull air behind it and, at the same time, push an electric aircraft 104 forward and with an equal amount of force. In an embodiment, and without limitation, the more air that is forced behind the electric aircraft 104, the greater the thrust force with which the electric aircraft 104 may be pushed horizontally will be. In another embodiment, and without limitation, forward thrust may force the electric aircraft 104 through the medium of relative air. Additionally or alternatively, the at least a flight component 108 may include one or more puller components. As used in this disclosure a "puller component" is a component that pulls and/or tows an aircraft through a medium. As a non-limiting example, puller component may include a flight component 108 such as a puller propeller, a puller motor, a tractor propeller, a puller propulsor, and the like. Additionally, or alternatively, puller component may include a plurality of puller flight components.

With continued reference to FIG. 1, in some embodiments, at least a flight component 108 may include a lift component. For the purposes of this disclosure, a "lift component" is a component and/or device used to propel a craft upward by exerting downward force on a fluid medium, which may include a gaseous medium such as air or a liquid medium such as water. The lift component may include any device or component that consumes electrical power on demand to propel an electric aircraft 104 in a direction or other vehicle while on ground or in-flight. The lift component may include a propulsor, a propeller, a blade, a motor, a rotor, a rotating element, an aileron, a rudder, arrangements thereof, combinations thereof, and the like. Each lift component, when a plurality is present, of plurality of flight components 108 may be configured to produce, in an embodiment, substantially upward and/or vertical thrust such that aircraft moves upward. For example, and without limitation, the lift component may include a rotor, propeller, paddle wheel and the like thereof, wherein a rotor is a component that produces torque along the longitudinal axis, and a propeller produces torque along the vertical axis. In an embodiment, the lift component may include a plurality of blades. As used in this disclosure a "blade" is a propeller that converts rotary motion from an engine or other power source into a swirling slipstream. In an embodiment, the blade may convert rotary motion to push the propeller forwards or backwards. In an embodiment, the lift component may include a rotating power-driven hub, to which may be attached several radial airfoil-section blades such that the whole assembly rotates about a longitudinal axis.

With continued reference to FIG. 1, in some embodiments, a lift component may be configured to produce a lift. As used in this disclosure a "lift" is a perpendicular force to the oncoming flow direction of fluid surrounding the surface. For example, and without limitation relative air speed may be horizontal to the aircraft, wherein lift force may be a force exerted in a vertical direction, directing the aircraft upwards. In an embodiment, and without limitation, the lift component may produce lift as a function of applying a torque to lift component. As used in this disclosure a "torque" is a measure of force that causes an object to rotate about an axis in a direction. For example, and without limitation, the torque may rotate an aileron and/or rudder to generate a force that may adjust and/or affect altitude, airspeed velocity, groundspeed velocity, direction during flight, and/or thrust. For example, a flight component 108 such as a power source(s) may apply a torque on lift component to produce lift.

With continued reference to FIG. 1, in some embodiments, at least a flight component 108 may include any such components and related devices as disclosed in U.S. Nonprovisional application Ser. No. 16/427,298, filed on May 30, 2019, entitled "SELECTIVELY DEPLOYABLE HEATED PROPULSOR SYSTEM," U.S. Nonprovisional App. Ser. No. 16/703,225, filed on Dec. 4, 2019, entitled "AN INTEGRATED ELECTRIC PROPULSION ASSEMBLY," U.S. Nonprovisional application Ser. No. 16/910,255, filed on Jun. 24, 2020, entitled "AN INTEGRATED ELECTRIC PROPULSION ASSEMBLY," U.S. Nonprovisional application Ser. No. 17/319,155, filed on May 13, 2021, entitled "AIRCRAFT HAVING REVERSE THRUST CAPABILITIES," U.S. Nonprovisional application Ser. No. 16/929,206, filed on Jul. 15, 2020, entitled "A HOVER AND THRUST CONTROL ASSEMBLY FOR DUAL-MODE AIRCRAFT," U.S. Nonprovisional application Ser. No. 17/001,845, filed on Aug. 25, 2020, entitled "A HOVER AND THRUST CONTROL ASSEMBLY FOR DUAL-MODE AIRCRAFT," U.S. Nonprovisional application Ser. No. 17/186,079, filed on Feb. 26, 2021, entitled "METHODS AND SYSTEM FOR ESTIMATING PERCENTAGE TORQUE PRODUCED BY A PROPULSOR CONFIGURED FOR USE IN AN ELECTRIC AIRCRAFT," and U.S. Nonprovisional application Ser. No. 17/321,662, filed on May 17, 2021, entitled "AIRCRAFT FOR FIXED PITCH LIFT," the entirety of each one of which is incorporated herein by reference.

With continued reference to FIG. 1, system 100 includes at least a battery 112. For the purposes of this disclosure, "battery" is an electrical device and/or component used to store and provide electrical energy to an electrical vehicle and its electrical subsystems. The at least a battery 112 is configured to power at least a flight component 108 of an electric aircraft 104. As a non-limiting example, the at least a battery 112 may power a lift component. As another non-limiting example, the at least a battery may power a pusher component. As another non-limiting example, the at least a battery 112 may power a propulsor of the electric aircraft 104. In some embodiments, the at least a battery 112 may include one or more battery cells, one or more battery modules, and/or one or more battery packs. A "battery pack," as used in this disclosure, is a set of battery modules. The battery pack may be consistent with a battery pack in FIG. 3. A "battery module," as used in this disclosure, is a set of battery cells. The battery module may be consistent with a battery module in FIG. 2. A "battery cell," as used in this disclosure, is a single anode and cathode separated by electrolyte, wherein the cell produces voltage and current. The battery cell may be consistent with a battery cell in FIG. 4. In some embodiments, the at least a battery 112 may be one or more various types of batteries, such as a pouch cell battery, stack batteries, prismatic battery, lithium-ion cells, or the like. In some embodiments, the at least a battery 112 may include a battery, flywheel, rechargeable battery, flow battery, glass battery, lithium-ion battery, ultra-battery, and the like thereof. Additionally without limitation, the at least a battery 112 disclosed herein may be consistent with a power source found in U.S. patent application Ser. No. 17/574,978, filed on Jan. 13, 2022, and entitled "APPARATUSES AND METHODS FOR PRECONDITIONING A POWER SOURCE OF AN ELECTRIC AIRCRAFT," which is incorporated in its entirety herein by reference.

With continued reference to FIG. 1, system 100 includes at least a sensor 116. For the purposes of this disclosure, a "sensor" is a device that produces an output signal for the purpose of sensing a physical phenomenon. For example, and without limitation, the at least a sensor 116 may transduce a detected phenomenon, such as without limitation, temperature, voltage, current, pressure, speed, motion, light, moisture, and the like, into a sensed signal. The at least a sensor 116 may output the sensed signal. The at least a sensor 116 may include any computing device as described in the entirety of this disclosure and configured to convert and/or translate a plurality of signals detected into electrical signals for further analysis and/or manipulation. As a non-limiting example, the at least a sensor 116 may detect a temperature of at least a battery 112 and output sensor data 116 of the temperature of the at least a battery 112 to a controller 120. The sensor data 116 and the controller 120 disclosed herein is further described in detail below. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by the at least a sensor 116 may include circuitry, computing devices, electronic components or a combination thereof that translates into at least an electronic signal configured to be transmitted to another electronic component. In a non-limiting embodiment, the at least a sensor 116 may include a plurality of sensors comprised in a sensor suite. In one or more embodiments, and without limitation, the at least a sensor 116 may include a plurality of sensors. The at least a sensor 116 disclosed herein may be consistent with a sensor described with respect to FIG. 6.

With continued reference to FIG. 1, at least a sensor 116 is communicatively connected to at least a battery 112. In some embodiments, the at least a sensor 116 is communicatively connected to a controller 120. For the purposes of this disclosure, "communicatively connected" means connected by way of a connection, attachment or linkage between two or more related which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, in one or more embodiments, at least a sensor 116 may include a sensor suite which may include a plurality of sensors that may detect similar or unique phenomena. For example, in a non-limiting embodiment, sensor suite may include a plurality of voltmeters or a mixture of voltmeters and thermocouples. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an aircraft. Independent sensors may include separate sensors measuring physical or electrical quantities that may be powered by and/or in communication with circuits independently, where each may signal sensor output to a control circuit such as controller 120. In one or more embodiments, at least a sensor may include a sense board, such as sense board. A sense board may have at least a portion of a circuit board that includes one or more sensors configured to, for example, measure a temperature of at least a battery 112. In one or more embodiments, a sense board may be connected to battery modules and/or cells of at least a battery 112. In one or more embodiments, a sense board may include one or more circuits and/or circuit elements, including, for example, a printed circuit board component. A sense board may include, without limitation, a control circuit configured to perform and/or direct any actions performed by the sense board and/or any other component and/or element described in this disclosure. The control circuit may include any analog or digital control circuit, including without limitation a combinational and/or synchronous logic circuit, a processor, microprocessor, microcontroller, or the like.

With continued reference to FIG. 1, at least a sensor 116 may include sensors configured to measure physical and/or electrical parameters. As a non-limiting example, temperature and/or voltage, of at least a battery 112 may be measured. For example, and without limitation, at least a sensor may monitor voltage and/or temperature of battery modules and/or cells of at least a battery 112. The at least a sensor 116 may be configured to detect failure within each battery module, for instance and without limitation, as a function of and/or using detected physical and/or electrical parameters. In one or more exemplary embodiments, battery cell failure may be characterized by a spike in temperature and at least a sensor may be configured to detect that increase in temperature and generate signals, which are discussed further below, to notify users, support personnel, safety personnel, flight crew, maintainers, operators, emergency personnel, aircraft computers, or a combination thereof. Detection may be performed using any suitable component, set of components, and/or mechanism for direct or indirect measurement and/or detection of voltage levels, including without limitation comparators, analog to digital converters, any form of voltmeter, or the like.

With continued reference to FIG. 1, in some embodiments, at least a sensor 116 may include an electrical sensor. As described in this disclosure, an "electrical sensor" is a device that is configured to detect an electrical parameter associated with an electrical phenomenon. Exemplary non-limiting electrical sensors include voltmeters, amp-meters, ohm-meters, multi-meters, oscilloscopes, and the like. As a non-limiting example, the electric sensor may detect a voltage of at least a battery 112 and transmit sensor data of the voltage of the at least a battery 112 to a controller 120. As another non-limiting example, the electric sensor may detect a current of at least a battery 112 and transmit sensor data of the current of the at least a battery 112 to the controller 120.

With continued reference to FIG. 1, in some embodiments, the at least a sensor 116 may include a temperature sensor 124. For the purposes of this disclosure, a "temperature sensor" is a device that detects thermal energy and outputs an electrical signal as a function of the detection of thermal energy. As a non-limiting example, the temperature sensor 124 may include thermocouples, thermistors, thermometers, passive infrared sensors, resistance temperature sensors (RTD's), semiconductor based integrated circuits (IC), a combination thereof or another undisclosed sensor type, alone or in combination. For the purposes of this disclosure and as would be appreciated by someone of ordinary skill in the art, "temperature" is a measure of the heat energy of a system. Temperature, as measured by any number or combinations of sensors, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection. As a non-limiting example, the temperature sensor 124 may detect a temperature of at least a battery 112 and transmit sensor data of the temperature of the at least a battery 112 to a controller 120.

With continued reference to FIG. 1, system 100 includes a controller 120. The controller 120 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. The controller 120 may include a single computing device operating independently, or may include two or more computing device operating in concert, in parallel, sequentially or the like; two or more computing devices may be included together in a single computing device or in two or more computing devices. The controller 120 may interface or communicate with one or more additional devices as described below in further detail via a network interface device. Network interface device may be utilized for connecting controller 120 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The controller 120 may include but is not limited to, for example, a computing device or cluster of computing devices in a first location and a second computing device or cluster of computing devices in a second location. The controller 120 may include one or more computing devices dedicated to data storage, security, distribution of traffic for load balancing, and the like. The controller 120 may distribute one or more computing tasks as described below across a plurality of computing devices of computing device, which may operate in parallel, in series, redundantly, or in any other manner used for distribution of tasks or memory between computing devices. The controller 120 may be implemented using a "shared nothing" architecture in which data is cached at the worker, in an embodiment, this may enable scalability of system 100 and/or computing device.

With continued reference to FIG. 1, a controller 120 may be designed and/or configured to perform any method, method step, or sequence of method steps in any embodiment described in this disclosure, in any order and with any degree of repetition. For instance, controller 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, a controller 120 is configured to receive sensor data 116 from at least a sensor 116 communicatively connected to at least a battery 112. For the purposes of this disclosure, "sensor data" is data transmitted from at least a sensor 116. As a non-limiting example, the sensor data 116 may include a temperature of the at least a battery 112 from a temperature sensor 124. As another non-limiting example, the sensor data 116 may include a current of the at least a battery 112 from an electrical sensor. As another non-limiting example, the sensor data 116 may include a voltage of the at least a battery 112 from an electrical sensor.

With continued reference to FIG. 1, a controller 120 is configured to identify a battery status 128 as a function of sensor data 116 and a battery threshold 132. For the purposes of this disclosure, a "battery threshold" is a threshold for sensor data from at least a sensor communicatively connected to at least a battery of an electric aircraft. In an embodiment, a battery threshold may include a temperature threshold 136. For the purposes of this disclosure, a "temperature threshold" is a threshold for a temperature of at least a battery of an electric aircraft. In another embodiment, a battery threshold may include a current threshold. For the purposes of this disclosure, a "current threshold" is a desirable boundary for a current of at least a battery of an electric aircraft. In some embodiments, battery threshold may include a voltage threshold. For the purposes of this disclosure, a "voltage threshold" is a threshold for a voltage of at least a battery of an electric aircraft. In some embodiments, a user may manually input the battery threshold 132 to the controller 120. For the purposes of this disclosure, a "user" is any person or a group that uses a system 100. As a non-limiting example, a user may include a pilot, a person, a group, or the like that is interacting with a remote device in communication with an electric aircraft 104, and the like. In some embodiments, the battery threshold 132 may be retrieved from a database.

With continued reference to FIG. 1, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, sensor data 116 outside a battery threshold 132 may indicate damage or increased possibility of future damage to an electric aircraft 104 and/or the at least a battery 112. As a non-limiting example, the damage may include a thermal runaway. For the purposes of this disclosure, a "thermal runaway" is a phenomenon in which at least a battery enters an uncontrollable, self-heating state. Thermal runaway may occur when at least a battery 112 develops lower resistances or lower triggering voltages as the internal temperature increases. As current flow gets markedly increased, increased power dissipation may raise the temperature further. A positive feedback effect of thermal runaway may cause failure, such as inefficient battery power usage, absence of battery power, electrical explosion, or fire. In some cases, ejecta debris may include, but is not limited to, gas, shrapnel, particulates from at least a battery 112, and the like thereof. In some cases, ejecta debris may include lithium-based compounds. Alternatively or additionally, ejecta debris may include carbon-based compounds, such as without limitation carbonate esters. Ejecta debris may include matter in any phase or form, including solid, liquid, gas, vapor, and the like. In some cases, ejecta debris may undergo a phase change, for example ejecta debris may be vaporous as it is initially being ejected and then cool and may condense into a solid or liquid after ejection. As another non-limiting example, the damage may include electrical insulation breakdown. For the purposes of this disclosure, "electrical insulation breakdown" refers to a process that occurs when an electrically insulating material, subjected to a high enough voltage, suddenly becomes a conductor and current flows through it. The electrical insulation breakdown may cause a failure of at least a battery 112 and/or an electric aircraft 104, and fire hazards.

With continued reference to FIG. 1, for the purposes of this disclosure, a "battery status" is a status of at least a battery of an electric aircraft. In an embodiment, the battery status 128 may include a status 0. For the purposes of this disclosure, "status 0" indicates that sensor data 116 from at least a sensor is within a battery threshold. As a non-limiting example, when a temperature threshold 136 is 140° F. and a temperature detected from a temperature sensor 124 communicatively connected to at least a battery 112 is 80° F., the battery status 128 may be the status 0. As another non-limiting example, when a voltage threshold is 2200V and a voltage detected from an electrical sensor communicatively connected to the at least a battery 112 is 150V, the battery status 128 may be the status 0. Various names that may be used to indicate the status 0 and status 1. As another non-limiting example, when a voltage threshold is 200V and a voltage detected from an electrical sensor communicatively connected to the at least a battery 112 is 150V, the battery status 128 may be the status 0. In another embodiment, the battery status 128 may include a status 1. For the purposes of this disclosure, "status 1" indicates that sensor data 116 from at least a sensor is outside a battery threshold. As a non-limiting example, when a temperature threshold 136 is 140° F. and a temperature detected from a temperature sensor 124 communicatively connected to at least a battery 112 is 150° F., the battery status 128 may be the status 1. As another non-limiting example, when a voltage threshold is 200V and a voltage detected from an electrical sensor communicatively connected to the at least a battery 112 is 220V, the battery status 128 may be the status 1. Persons skilled in the art, upon reviewing the entirety of this disclosure, would appreciate, after having read the entirety of this disclosure, various names that may be used to indicate the status 0 and status 1.

With continued reference to FIG. 1, in some embodiments, a battery status 128 may be calculated by subtracting sensor data 116 from a battery threshold 132. In an embodiment, when a value of the subtraction is a positive value, then the battery status 128 may be a status 0. As a non-limiting example, when a temperature threshold 136 is 140° F. and a temperature detected from a temperature sensor 124 communicatively connected to at least a battery 112 is 80° F., a controller 120 may subtract 80° F. from 140° F., which gives a positive value of 60, the battery status 128 may be the status 0.

In another embodiment, when a value of the subtraction is zero, then the battery status 128 may be a status 1. As a non-limiting example, when a temperature threshold 136 is 140° F. and a temperature detected from a temperature sensor 124 communicatively connected to at least a battery 112 is 140° F., a controller 120 may subtract 140° F. from 140° F., which gives 0, the battery status 128 may be the status 1. This is so, when the sensor data 116 includes a temperature of at least a battery 112 and a battery threshold 132 includes a temperature threshold 136, a zero from subtraction of sensor data 116 from a battery threshold 132 may indicate there is an issue in the at least a battery 112. Thus, this may indicate a power from the at least a battery 112 to at least a flight component 108 may need to be controlled. As another non-limiting example, when a voltage threshold is 30V and a voltage detected from an electrical sensor communicatively connected to at least a battery 112 is 30V, a controller 120 may subtract 30V from 30V, which gives zero, the battery status 128 may be the status 1. This is so, when the sensor data 116 includes a voltage of at least a battery 112 and a battery threshold 132 includes a voltage threshold, a zero from subtraction of sensor data 116 from a battery threshold 132 may indicate there is an issue in the at least a battery 112. Thus, this may indicate a power from the at least a battery 112 to at least a flight component 108 may need to be controlled. As another non-limiting example, when a current threshold is 230 mAh and a current detected from an electrical sensor communicatively connected to at least a battery 112 is 230 mAh, a controller 120 may subtract 230 mAh from 230 mAh, which gives zero, the battery status 128 may be the status 1. This is so, when the sensor data 116 includes a current of at least a battery 112 and a battery threshold 132 includes a current threshold, a zero from subtraction of sensor data 116 from a battery threshold 132 may indicate there is an issue in the at least a battery 112. Thus, this may indicate a power from the at least a battery 112 to at least a flight component 108 may need to be controlled. In another embodiment, when a value of the subtraction is zero, then the battery status 128 may be a status 0, wherein sensor data 116 may be from an electrical sensor and a battery threshold 132 may include a resistance threshold. As a non-limiting example, when the resistance threshold is 400 mOhms and a resistance detected from an electrical sensor communicatively connected to at least a battery 112 is 400 mOhms, a controller 120 may subtract 400 mOhms from 400 mOhms, which gives zero, the battery status 128 may be the status 0.

With continued reference to FIG. 1, in another embodiment, when a value of the subtraction is a negative value, then the battery status 128 may be the status 1. As a non-limiting example, when a temperature threshold 136 is 140° F. and a temperature detected from a temperature sensor 124 communicatively connected to at least a battery 112 is 160° F., a controller 120 may subtract 160° F. from 140° F., which gives a negative value, −20, the battery status 128 may be the status 1. This is so, when the sensor data 116 includes a temperature of at least a battery 112 and a battery threshold 132 includes a temperature threshold 136, a negative value of a subtraction of sensor data 116 from a battery threshold 132 may indicate there is an issue in the at least a battery 112. Thus this may indicate a power from the at least a battery 112 to at least a flight component 108 may need to be controlled.

As another non-limiting example, when a voltage threshold is 30V and a voltage detected from an electrical sensor communicatively connected to at least a battery 112 is 35V, a controller 120 may subtract 35V from 30V, which gives a negative value, −5, the battery status 128 may be the status 1. This is so, when the sensor data 116 includes a voltage of at least a battery 112 and a battery threshold 132 includes a voltage threshold, a negative value of a subtraction of sensor data 116 from a battery threshold 132 may indicate there is an issue in the at least a battery 112. Thus this may indicate a power from the at least a battery 112 to at least a flight component 108 may need to be controlled. As another non-limiting example, when a current threshold is 230 mAh and a current detected from an electrical sensor communicatively connected to at least a battery 112 is 250 mAh, a controller 120 may subtract 250 mAh from 230 mAh, which gives a negative value, −20, the battery status 128 may be the status 1. This is so, when the sensor data 116 includes a current of at least a battery 112 and a battery threshold 132 includes a current threshold, a negative value of a subtraction of sensor data 116 from a battery threshold 132 may indicate there is an issue in the at least a battery 112. Thus this may indicate a power from the at least a battery 112 to at least a flight component 108 may need to be controlled. In another embodiment, when a value of subtraction is a negative value, then the battery status 128 may be a status 0, wherein sensor data 116 may be from an electrical sensor and a battery threshold 132 may include a resistance threshold. As a non-limiting example, when the resistance threshold is 400 mOhms and a resistance detected from an electrical sensor communicatively connected to at least a battery 112 is 500 mOhms, a controller 120 may subtract 400 mOhms from 500 mOhms, which gives a negative value, −100, the battery status 128 may be the status 0.

With continued reference to FIG. 1, in some embodiments, a controller 120 is configured to control a power from at least a battery 112 to at least a flight component 108 of an electric aircraft 104 as a function of a battery status 128. In some embodiments, the controller 120 may be configured to control the power from the at least a battery to the at least a flight component 108 by controlling one or more inverters that are communicatively connected to an electric motor. An "inverter," as used in this this disclosure, is a power electronic device or circuitry that changes direct current (DC) to alternating current (AC). An inverter (also called a power inverter) may be entirely electronic or may include at least a mechanism (such as a rotary apparatus) and electronic circuitry. In some embodiments, static inverters may not use moving parts in conversion process. Inverters may not produce any power itself; rather, inverters may convert power produced by a DC power source. Inverters may often be used in electrical power applications where high currents and voltages are present; circuits that perform a similar function, as inverters, for electronic signals, having relatively low currents and potentials, may be referred to as oscillators. In some cases, circuits that perform opposite function to an inverter, converting AC to DC, may be referred to as rectifiers. Further description related to inverters and their use with electrical motors is disclosed within U.S. Patent application. Nos. 17/144,304 and entitled "METHODS AND SYSTEMS FOR A FRACTIONAL CONCENTRATED STATOR CONFIGURED FOR USE IN ELECTRIC AIRCRAFT MOTOR" filed on Jan. 8, 2021 and by C. Lin et the entirety of which is incorporated by reference. Additional descriptions related to inverters and electrical motors are disclosed in U.S. patent application Ser. No. 17/197,427 entitled "SYSTEM AND METHOD FOR FLIGHT CONTROL IN ELECTRIC AIRCRAFT" by T. Richter et al. and filed on Mar. 10, 2021, the entirety of which is incorporated by reference. Additional descriptions related to an inverter may be found in U.S. patent application Ser. No. 17/852,905, filed on Jun. 29, 2022, and entitled "AN APPARATUS AND METHOD FOR OPTIMIZING MOTOR PERFORMANCE IN AN ELECTRIC AIRCRAFT," the entirety of which is incorporated by reference. The electric motor disclosed herein is further described above. In an embodiment, when the battery status 128 is status 0, the controller 120 may be configured to not control the power of the at least a battery 112 to the flight component 108. In another embodiment, when the battery status 128 is status 1, the controller 120 may be configured to reduce the power of the at least a battery 112 to the flight components 108. As a non-limiting example, when the battery status 128 is status 1, the controller 120 may reduce the power of the at least a battery 112, and that may be reducing a current of the at least a battery 112. As another non-limiting example, when the battery status 128 is status 1, the controller 120 may reduce the power of the at least a battery 112, and that may be reducing a voltage of the at least a battery 112. As a non-limiting example, when the battery status 128 is status 1, the controller 120 may reduce the power of the at least a battery 112, and that may reduce revolution per minute (RPM) of a propulsor. As another non-limiting example, when the battery status 128 is status 1, the controller 120 may reduce the power of the at least a battery 112, and that may reduce a torque of a propulsor.

With continued reference to FIG. 1, in some embodiments, a controller 120 may be configured to control a power of at least a battery 112 as a function of a status weight 140. For the purposes of this disclosure, a "status weight" is a difference between sensor data and a battery threshold. As a non-limiting example, when the subtraction of a sensor data 116 from a battery threshold 132 is a positive value of 60, then the status weight 140 is 60. As a non-limiting example, when the subtraction of a sensor data 116 from a battery threshold 132 is a negative value, −20, then the status weight 140 is 20. As a non-limiting example, when the subtraction of a sensor data 116 from a battery threshold 132 is zero, then the status weight 140 is zero. In some embodiments, smaller the status weight 140 is more power of the at least a battery 112 may need to be reduced. As a non-limiting example, in the case that a battery status 128 is status 1 and a status weight 140 is 30 wherein a subtraction of a temperature of the at least a battery 112 from a temperature threshold 136 is −30, the controller 120 may be configured to reduce more power than a case where the battery status is status 1 and a status weight 140 is 20 wherein the subtraction of the temperature of the at least a battery 112 from the temperature threshold 136 is −20. As another non-limiting example, in the case that a battery status 128 is status 1 and a status weight 140 is 30 wherein a subtraction of a voltage of the at least a battery 112 from a voltage threshold is −30, the controller 120 may be configured to reduce more power than a case where the battery status is status 1 and a status weight 140 is 20 wherein the subtraction of the voltage of the at least a battery 112 from the voltage threshold is −20.

With continued reference to FIG. 1, in some embodiments, a controller 120 may be configured to generate a battery alert 144 as a function of a battery status 128, status weight 140, and an alert range 148. For the purposes of this disclosure, a "battery alert" is an alert to indicate a user about a battery status. As a non-limiting example, the battery alert 144 may include 'battery is heated,' 'reduce a power of a battery,' 'a temperature of a battery is about to hit a threshold,' 'a status of a battery is fine,' and/or 'a temperature of a battery is within a threshold,' 'there is no need to reduce a power of a battery,' and the like. As another non-limiting example, the battery alert 144 may include a various format, for example, without limitation, a video, an image, a text, an audio, a vibration, and the like. For the purposes of this disclosure, an "alert range" is a range of values of battery weight. In some embodiments, a user may manually input the alert range 148 into the controller 120. In some embodiments, the alert range 148 may be predetermined.

With continued reference to FIG. 1, in an embodiment, a controller 120 may be configured to generate a battery alert 144 when a battery status 128 is status 1. As a non-limiting example, when the battery status is status 1, the controller 120 may generate the battery alert 144 as 'battery is heated,' and/or 'reduce a power of a battery.' In another embodiment, the controller 120 may generate the battery alert 144 when the battery status is status 0 and the status weight 140 is outside an alert range 148. As a non-limiting example, when the battery status is status 0, battery weight is 20 and an alert range 148 is 10, the controller 120 may generate the battery alert 144 as 'a status of a battery is fine,' and/or 'a temperature of a battery is within a threshold.' In another embodiment, the controller 120 may generate the battery alert 144 when the battery status is status 0 and the status weight 140 is within the alert range 148. As another non-limiting example, when the battery status is 1 and the battery weight is 5, and the alert range 148 is 10, the controller 120 may generate the battery alert 144 as 'a temperature of a battery is about to hit a threshold.' As another non-limiting example, when the battery status is 0 and the battery weight is 10, and the alert range 148 is 10, the controller 120 may generate the battery alert 144 as 'a temperature of a battery is about to hit a threshold.'

With continued reference to FIG. 1, in some embodiments, a system 100 may include a display device 152. For the purposes of this disclosure, a "display device" is a device that conveys information. As a non-limiting example, the display device 152 may include smartphones, tablets, laptops, monitors, headsets, and the like. In an embodiment, the display device 152 may convey information in a text format. In some embodiments, the display device 152 may convey information in a video format. In some embodiments, the display device 152 may convey information in an audio format. In some embodiments, the display device 152 may convey information in animation. In some embodiments, a controller 120 may be communicatively connected to the display device 152. In some embodiments, a controller 120 may be configured to display sensor data 116 to a user on the display device. As a non-limiting example, the controller 120 may display a temperature of at least a battery 112. As another non-limiting example, the controller 120 may display a current of the at least a battery 112. As another non-limiting example, the controller 120 may display a voltage of the at least a battery 112. In some embodiments, the controller 120 may be configured to display a battery alert 144 to a user. As a non-limiting example, the controller 120 may display 'reduce a power of a battery' in a text form. As another non-limiting example, the controller 120 may display 'battery is heated' in an audio form. The battery alert 144 disclosed herein is further described above. In some embodiments, the display may include a screen, a phone, a tablet, a laptop, a computer, and the like. In some embodiments, the flight controller 120 may display a query to a user. For the purposes of this disclosure, a "query" is a question. As a non-limiting example, a query may include yes or no. As another non-limiting example, the query may include a question asking what to do to reduce a power of at least a battery 112. For example, the query may ask if a user wants to reduce a torque to a propulsor, reduce RPM of the propulsor, reduce a voltage of the at least a battery 112, and the like.

With continued reference to FIG. 1, in some embodiments, a system may include a user input device 156. For the purposes of this disclosure, a "user input device" is a device that a user can input a user input. For the purposes of this disclosure, a "user input" is any input a user can input to a user input device. In an embodiment, the user input device 156 may include a touch screen. As a non-limiting example, a user may touch a screen to input a user input. In some embodiments, the user input device 156 may include a switch. For the purposes of this disclosure, a "switch" is an electrical component that can disconnect or connect the conducting path in an electrical circuit. As a non-limiting example, the switch may include a toggle switch, rotary switch, mercury switch, push-button switch, reversing switch, relay, circuit breaker, and the like. In some embodiments, the user input device 156 may be communicatively connected to a flight controller 120. In some embodiments, the user input device 156 may be configured to transmit a user input to a flight controller 120. In some embodiments, a flight controller 120 may be configured to receive a user input from a user input device 156. As a non-limiting example, a user may control a switch to generate the user input. In some embodiments, the flight controller 120, then, may be configured to control the power of the at least a battery 112 as a function of the user input from the user input device 156. For example with limitation, the flight controller 120 may display the query asking a user whether the user wants to reduce a power of at least a battery 112. When the user inputs 'yes,' then the flight controller 120 may control the power of the at least a battery 112. When the user inputs 'no,' the flight controller 120 may not reduce the power of the at least a battery 112. In some embodiments, the flight controller 120 may be configured to control the power of the at least a battery 112 only after getting a user input from a user. In some embodiments, the flight controller 120 may be configured to control the power of the at least a battery 112 without getting a user input from a user. In some embodiments, the user may respond to a battery alert 144 using the user input device 156. As a non-limiting example, when the flight controller 120 display a battery alert 144 to a user on a display device 152 as 'battery is heated,' a user may touch a screen to click reduce a power of at least a battery 112. The flight controller 120 then may control the power of the at least a battery 112. In some embodiments, user may be a pilot of the electric aircraft.

With continued reference to FIG. 1, additionally without limitation, additional description related to system 100 may be found in U.S. patent application Ser. No. 17/515,433, filed on Oct. 30, 2021, and entitled "SYSTEMS AND METHODS FOR BATTERY MANAGEMENT FOR A VEHICLE," the entirety of which is incorporated herein by reference.

Figure 2:
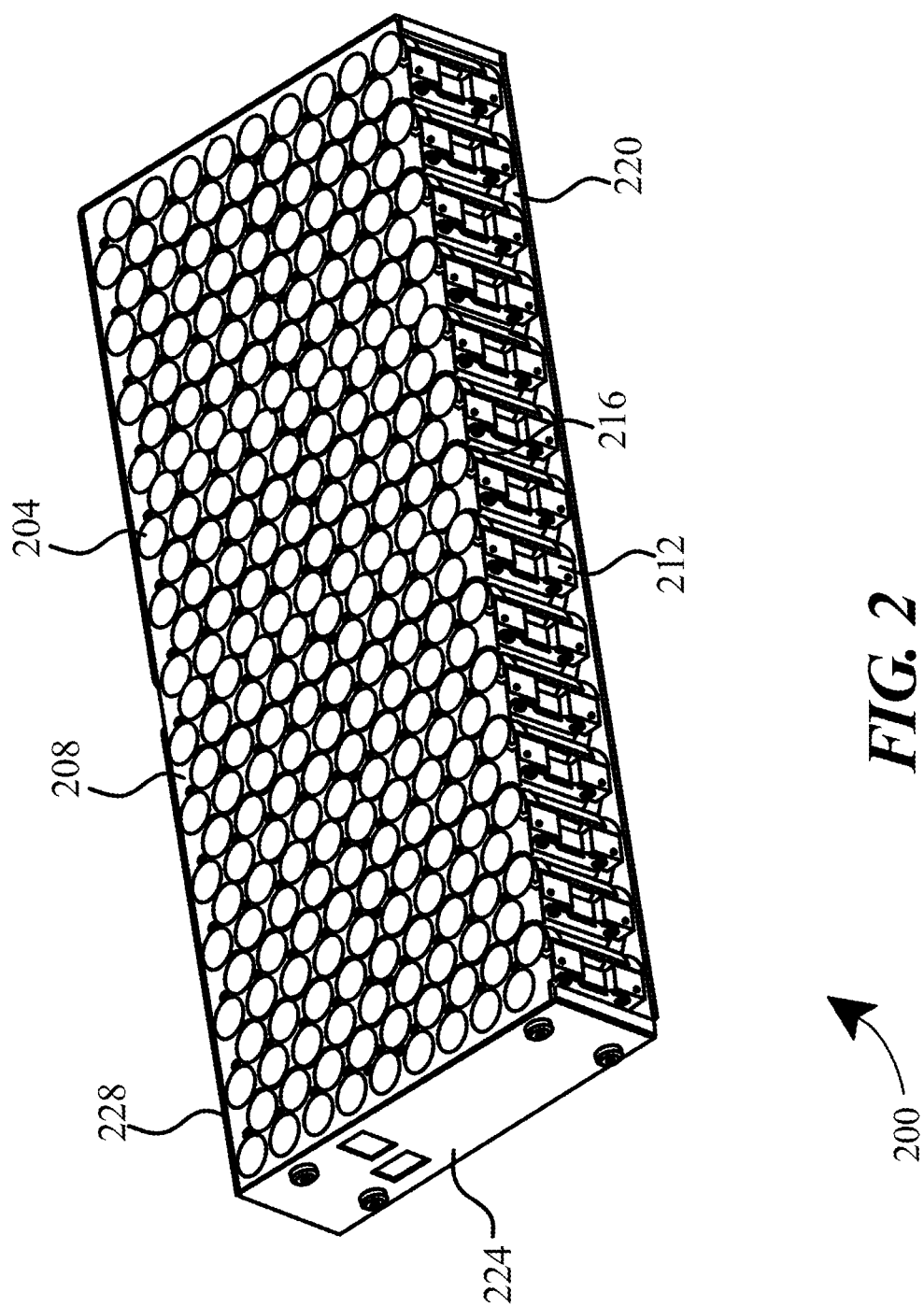
FIG. 2 schematically illustrates an exemplary battery module.

Referring now to FIG. 2, battery module 200 with multiple battery units 216 is illustrated, according to embodiments. Battery module 200 may comprise a battery cell 204, cell retainer 208, cell guide 212, protective wrapping, back plate 220, end cap 224, and side panel 228. Battery module 200 may comprise a plurality of battery cells, an individual of which is labeled 204. In embodiments, battery cells 204 may be disposed and/or arranged within a respective battery unit 216 in groupings of any number of columns and rows. For example, in the illustrative embodiment of FIG. 2, battery cells 204 are arranged in each respective battery unit 216 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 2 battery cells 204 are arranged 18 to battery unit 216 with a plurality of battery units 216 comprising battery module 200, one of skill in the art will understand that battery cells 204 may be arranged in any number to a row and in any number of columns and further, any number of battery units may be present in battery module 200. According to embodiments, battery cells 204 within a first column may be disposed and/or arranged such that they are staggered relative to battery cells 204 within a second column. In this way, any two adjacent rows of battery cells 204 may not be laterally adjacent but instead may be respectively offset a predetermined distance. In embodiments, any two adjacent rows of battery cells 204 may be offset by a distance equal to a radius of a battery cell. This arrangement of battery cells 204 is only a non-limiting example and in no way precludes other arrangement of battery cells.

Still referring to FIG. 2, in some embodiments, battery cells 204 may be fixed in position by cell retainer 208. For the illustrative purpose within FIG. 2, cell retainer 208 is depicted as the negative space between the circles representing battery cells 204. Cell retainer 208 comprises a sheet further comprising circular openings that correspond to the cross-sectional area of an individual battery cell 204. Cell retainer 208 comprises an arrangement of openings that inform the arrangement of battery cells 204. In embodiments, cell retainer 208 may be configured to non-permanently, mechanically couple to a first end of battery cell 204.

Still referring to FIG. 2, according to embodiments, battery module 200 may further comprise a plurality of cell guides 212 corresponding to each battery unit 216. Cell guide 212 may comprise a solid extrusion with cutouts (e.g. scalloped) corresponding to the radius of the cylindrical battery cell 204. Cell guide 212 may be positioned between the two columns of a battery unit 216 such that it forms a surface (e.g. side surface) of the battery unit 216. In embodiments, the number of cell guides 212 therefore may match in quantity to the number of battery units 216. Cell guide 212 may comprise a material suitable for conducting heat.

Still referring to FIG. 2, battery module 200 may also comprise a protective wrapping woven between the plurality of battery cells 204. Protective wrapping may provide fire protection, thermal containment, and thermal runaway during a battery cell malfunction or within normal operating limits of one or more battery cells 204 and/or potentially, battery module 200 as a whole. Battery module 200 may also comprise a backplate 220. Backplate 220 is configured to provide structure and encapsulate at least a portion of battery cells 204, cell retainers 208, cell guides 212, and protective wraps. End cap 224 may be configured to encapsulate at least a portion of battery cells 204, cell retainers 208, cell guides 212, and battery units 216, as will be discussed further below, end cap may comprise a protruding boss that clicks into receivers in both ends of back plate 220, as well as a similar boss on a second end that clicks into sense board. Side panel 228 may provide another structural element with two opposite and opposing faces and further configured to encapsulate at least a portion of battery cells 204, cell retainers 208, cell guides 212, and battery units 216.

Still referring to FIG. 2, in embodiments, battery module 200 can include one or more battery cells 204. In another embodiment, battery module 200 comprises a plurality of individual battery cells 204. Battery cells 204 may each comprise a cell configured to include an electrochemical reaction that produces electrical energy sufficient to power at least a portion of an electric aircraft. Battery cell 204 may include electrochemical cells, galvanic cells, electrolytic cells, fuel cells, flow cells, voltaic cells, or any combination thereof—to name a few. In embodiments, battery cells 204 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 204 may use the term 'wired', but one of ordinary skill in the art would appreciate that this term is synonymous with 'electrically connected', and that there are many ways to couple electrical elements like battery cells 204 together. As an example, battery cells 204 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 204 may be wired in a series-parallel circuit which combines characteristics of the constituent circuit types to this combination circuit. Battery cells 204 may be electrically connected in any arrangement which may confer onto the system the electrical advantages associated with that arrangement such as high-voltage applications, high-current applications, or the like. As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

Still referring to FIG. 2, according to embodiments and as discussed above, any two rows of battery cells 204 and therefore cell retainer 208 openings are shifted one half-length so that no two battery cells 204 are directly next to the next along the length of the battery module 200, this is the staggered arrangement presented in the illustrated embodiment of FIG. 2. Cell retainer 208 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 208 may comprise staggered openings that align with battery cells 204 and further configured to hold battery cells 204 in fixed positions. Cell retainer 208 may comprise an injection molded component. Injection molded component may comprise a component manufactured by injecting a liquid into a mold and letting it solidify, taking the shape of the mold in its hardened form. Cell retainer 208 may comprise liquid crystal polymer, polypropylene, polycarbonate, acrylonitrile butadiene styrene, polyethylene, nylon, polystyrene, polyether ether ketone, to name a few. Cell retainer 208 may comprise a second cell retainer fixed to the second end of battery cells 204 and configured to hold battery cells 204 in place from both ends. The second cell retainer may comprise similar or the exact same characteristics and functions of first cell retainer 208. Battery module 200 may also comprise cell guide 212. Cell guide 212 includes material disposed in between two rows of battery cells 204. In embodiments, cell guide 212 can be configured to distribute heat that may be generated by battery cells 204.

Still referring to FIG. 2, battery module 200 may also comprise back plate 220. Back plate 220 is configured to provide a base structure for battery module 200 and may encapsulate at least a portion thereof. Backplate 220 can have any shape and includes opposite, opposing sides with a thickness between them. In embodiments, back plate 220 may comprise an effectively flat, rectangular prism shaped sheet. For example, back plate 220 can comprise one side of a larger rectangular prism which characterizes the shape of battery module 200 as a whole. Back plate 220 also comprises openings correlating to each battery cell 204 of the plurality of battery cells 204. Back plate 220 may comprise a lamination of multiple layers. The layers that are laminated together may comprise FR-2, a glass-reinforced epoxy laminate material, and a thermal barrier of a similar or exact same type as disclosed hereinabove. Back plate 220 may be configured to provide structural support and containment of at least a portion of battery module 200 as well as provide fire and thermal protection.

Still referring to FIG. 2, battery module 200 may also comprise first end cap 224 configured to encapsulate at least a portion of battery module 200. End cap 224 may provide structural support for battery module 200 and hold back plate 220 in a fixed relative position compared to the overall battery module 200. End cap 224 may comprise a protruding boss on a first end that mates up with and snaps into a receiving feature on a first end of back plate 220. End cap 224 may comprise a second protruding boss on a second end that mates up with and snaps into a receiving feature on sense board.

Still referring to FIG. 2, battery module 200 may also comprise at least a side panel 228 that may encapsulate two sides of battery module 200. Side panel 228 may comprise opposite and opposing faces comprising a metal or composite material. In the illustrative embodiment of FIG. 2, a second side panel 228 is present but not illustrated so that the inside of battery module 200 may be presented. Side panel(s) 228 may provide structural support for battery module 200 and provide a barrier to separate battery module 200 from exterior components within aircraft or environment.

Figure 3:
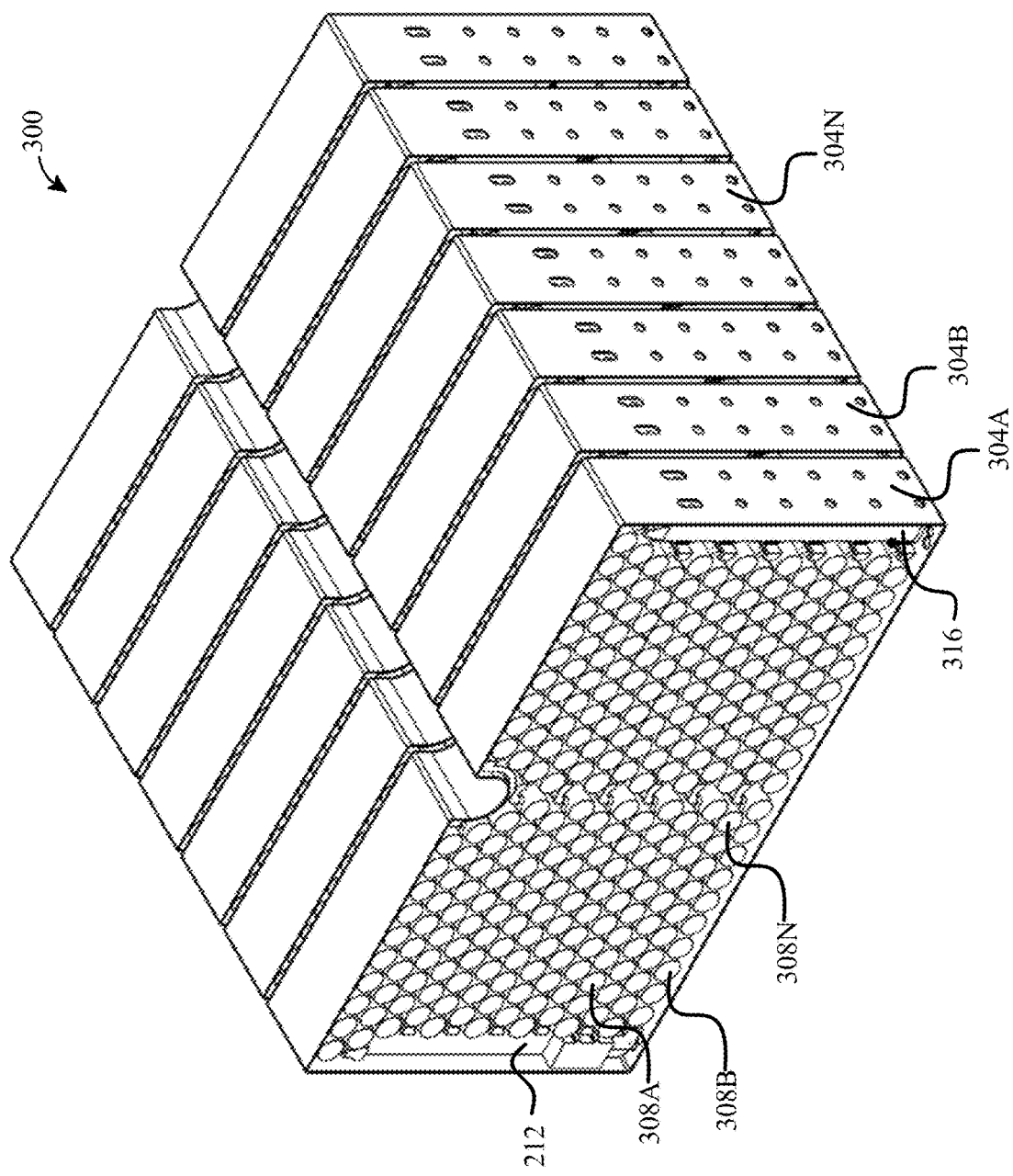
FIG. 3 is a perspective drawing illustrating a battery pack, according to embodiments.

Referring now to FIG. 3, a perspective drawing of an embodiment of a battery pack with a plurality of battery modules disposed therein 300. The configuration of battery pack 300 is merely exemplary and should in no way be considered limiting. Battery pack 300 is configured to facilitate the flow of the media through each battery module of the plurality of battery modules to cool the battery pack. Battery pack 300 can include one or more battery modules 304A-N. Battery pack 300 is configured to house and/or encase one or more battery modules 304A-N. Each battery module of the plurality of battery modules 304A-N may include any battery module as described in further detail in the entirety of this disclosure. As an exemplary embodiment, FIG. 3 illustrates 7 battery modules 304A-N creating battery pack 300, however, a person of ordinary skill in the art would understand that any number of battery modules 304A-N may be housed within battery pack 300. In an embodiment, each battery module of the plurality of battery modules 304A-N can include one or more battery cells 308A-N. Each battery module 304A-N is configured to house and/or encase one or more battery cells 308A-N. Each battery cell of the plurality of battery cells 308A-N may include any battery cell as described in further detail in the entirety of this disclosure. Battery cells 308A-N may be configured to be contained within each battery module 304A-N, wherein each battery cell 308A-N is disposed in any configuration without limitation. As an exemplary embodiment, FIG. 3 illustrates 240 battery cells 308A-N housed within each battery module 304A-N, however, a person of ordinary skill in the art would understand that any number of battery units 308A-N may be housed within each battery module 304A-N of battery pack 300. Further, each battery module of the plurality of battery modules 304A-N of battery pack 300 includes circuit 312. Circuit 312 may include any circuit as described in further detail in the entirety of this disclosure. Each battery module of the plurality of battery modules 304A-N further includes second circuit 316. Second circuit 316 may include any circuit as described in further detail in the entirety of this disclosure. Persons skilled in the art, upon reviewing the entirety of this disclosure, will be aware of various configurations of the plurality of battery modules that may be utilized for the battery pack consistently with this disclosure.

Still referring to FIG. 3, in some embodiments, a battery unit may be configured to couple to one or more other battery units, wherein the combination of two or more battery units forms at least a portion of vehicle battery and/or charging battery. Battery unit may be configured to include a plurality of battery cells. The plurality of battery cells may include any battery cell as described in the entirety of this disclosure. In the instant embodiment, for example and without limitation, battery unit includes a first row of battery cells, wherein first row of battery cells is in contact with the first side of the thermal conduit, as described in further detail below. As a non-limiting example, row of battery cells is configured to contain ten columns of battery cells. Further, in the instant embodiment, for example and without limitation, battery unit includes a second row of battery cells, wherein second row of battery cells is in contact with the second side of the thermal conduit, as described in further detail below. As a non-limiting example, second row of battery cells is configured to contain ten columns of battery cells. In some embodiments, battery unit may be configured to contain twenty battery cells in first row and second row. Battery cells of battery unit may be arranged in any configuration, such that battery unit may contain any number of rows of battery cells and any number of columns of battery cells. In embodiments, battery unit may contain any offset of distance between first row of battery cells and second row of battery cells, wherein the battery cells of first row and the battery cells of second row are not centered with each other. In the instant embodiment, for example and without limitation, battery unit includes first row and adjacent second row each containing ten battery cells, each battery cell of first row and each battery cell of second row are shifted a length measuring the radius of a battery cell, wherein the center of each battery cell of first row and each battery cell of second row are separated from the center of the battery cell in the adjacent column by a length equal to the radius of the battery cell. As a further example and without limitation, each battery cell of first row and each battery cell of second row are shifted a length measuring a quarter the diameter of each battery cell, wherein the center of each battery cell of first row and each battery cell of second row are separated from the center of a battery cell in the adjacent column by a length equal to a quarter of the diameter of the battery cell. First row of battery cells and second row of battery cells of the plurality of battery unit may be configured to be fixed in a position by utilizing a cell retainer, as described in the entirety of this disclosure. Each battery cell may be connected utilizing any means of connection as described in the entirety of this disclosure. In some embodiments, battery unit can include thermal conduit, wherein thermal conduit has a first surface and a second opposite and opposing surface. In some cases, height of thermal conduit may not exceed the height of battery cells, as described in the entirety of this disclosure. For example and without limitation, thermal conduit may be at a height that is equal to the height of each battery cell of first row and second row. Thermal conduit is configured to include an indent in the component for each battery cell coupled to the first surface and/or the second surface of thermal conduit. Persons skilled in the art, upon reviewing the entirety of this disclosure, will be aware of components that may be used as thermal conduits consistently with this disclosure.

Still referring to FIG. 3, in some embodiments, thermal conduit may include at least a passage, wherein the plurality of passage comprises an opening starting at the first end of thermal conduit and terminating at a second, opposing end of thermal conduit. The "passage", as described herein, is a horizontal channel with openings on each end of the thermal conduit. The plurality of passage may be configured to have a hollow shape comprising one or more sides, at least two ends (e.g. a top and a bottom), and a length, wherein the hollow shape comprises a void having a shape the same as or different from the shape of the plurality of passage and terminating at an opposite, opposing second end of the shape. For example and without limitation, in some embodiments, the plurality of passage comprises a rectangle shaped tubular shape. In embodiments, the tubular component runs effectively perpendicular to each battery cell. In embodiments, the plurality of passage can be disposed such that it forms a void originating at a first side of the battery module and terminating at the second, opposite, and opposing side, of the battery module. According to embodiments, the plurality of passage and/or thermal conduit may be composed utilizing any suitable material. For example and without limitation, thermal conduit and/or the plurality of passage may be composed of polypropylene, polycarbonate, acrylonitrile butadiene styrene, polyethylene, nylon, polystyrene, polyether ether ketone, and the like.

Still referring to FIG. 3, in some embodiments, the plurality of passage may be disposed in the thermal conduit such that the plurality of passage is configured to allow the travel of a media from a first end of thermal conduit to the second, opposite, and opposite end of thermal conduit. For example, the plurality of passage can be disposed to allow the passage of the media through the hollow opening/void of the plurality of passage. The media may include any media as described in the entirety of this disclosure. The hollow opening of thermal conduit and/or the plurality of passage may be configured to be of any size and/or diameter. For example and without limitation, the hollow opening of the plurality of passage may be configured to have a diameter that is equal to or less than the radius of each battery cell. The plurality of passage and/or thermal conduit may have a length equal or less than the length of one row of battery cells such that thermal conduit and/or the plurality of passage is configured to not exceed the length of first row and/or second row of battery cells. The opening of the plurality of passage can be configured to be disposed at each end of thermal conduit, wherein the plurality of passage may be in contact with each battery cell in a respective battery unit located at the end of each column and/or row of the battery unit. For example and without limitation, in some embodiments, a battery unit can contain two rows with ten columns of battery cells and the opening of the plurality of passage on each end of thermal conduit that is in contact with a respective battery cell at the end of each of the two columns. Persons skilled in the art, upon reviewing the entirety of this disclosure, will be aware of various components that may be used as at least a passage consistently with this disclosure.

Still referring to FIG. 3, in some embodiments, circuit and/or thermal conduit may be configured to facilitate the flow of the media through each battery module of the plurality of battery modules to cool the battery pack. The media may include any media described in further detail in the entirety of this disclosure. Circuit can include any circuit as described above in further detail. In the embodiment, circuit may be configured to couple to a first end of thermal conduit, wherein coupling is configured to facilitate the flow of the media from the circuit to the first end of thermal conduit through the plurality of passage. Coupling may include any coupling as described in further detail throughout the entirety of this disclosure. Circuit may include any component configured to facilitate the flow of media to the battery pack by utilizing an electrical current. For example and without limitation, circuit may include a printed circuit board, wherein the printed circuit board mechanically supports the electrical connection facilitating the flow of media to the battery pack. Circuit may be configured to include first end and a second end, wherein the second end is opposite the first end of circuit. In some embodiments, first end of circuit is in a plane perpendicular to the longitudinal axis of thermal conduit. First end of circuit is configured to include media feed component. The embodiment of circuit illustrates media feed component disposed only on first side of circuit; however this is non-limiting and circuit may include media feed component disposed on the second end of circuit. The media feed component of circuit may be configured to allow the media to feed into circuit, the battery module and/or the battery pack, wherein the flow of media may be initiated as a function of coupling media feed component of circuit to the media feeder of the thermal management apparatus. Media feed component can include any media feed component as described in further detail above. In some embodiments, media feed component is a threaded hole, wherein the media feeder of the thermal management apparatus is configured to couple to the threaded hole of media feed component, however this is non-limiting and media feed component may include, without limitation, a magnetic component, a latching mechanism, a pressure fit tubing mechanism, a nozzle mechanism, a hole, a flap, and the like.

Still referring to FIG. 3, in some embodiments, thermal conduit can include any thermal conduit as described in further detail above. The height of thermal conduit may not exceed the height of each battery cell of the plurality of battery cells, in some cases, as described in the entirety of this disclosure. Thermal conduit may be composed of any suitable material, as described above in further detail above. Thermal conduit may be configured to include any curvature of the first side and/or second side of thermal conduit. For example and without limitation the curvature of the first side and/or second side of thermal conduit correlates at least a portion of a battery cell of the plurality of battery cells. As a further example and without limitation, in an embodiment, thermal conduit may be configured to include ten curves of the first surface of thermal conduit, wherein each curve is configured to contain the plurality of portion of each battery cell of the plurality of battery cells adjacent to the first surface of thermal conduit. As a further example and without limitation, in some embodiments, thermal conduit may be configured to include ten curves on the second surface of thermal conduit wherein each curve may be configured to contain the plurality of portion of each battery cell of the plurality of battery cells adjacent to the second surface of thermal conduit. The embodiment of thermal conduit illustrates ten curves on each surface of thermal conduit; however this is non-limiting and thermal conduit may include any number of curves on each surface of thermal conduit, wherein each curve corresponds to the plurality of portion of a battery cell of the plurality of battery cells.

Still referring to FIG. 3, in some embodiments, thermal conduit can include any thermal conduit as described in further detail above. As described in further detail above, thermal conduit may be composed of any suitable material. Further, thermal conduit may be configured to include any curvature of the first side and/or second side of the thermal conduit, as described in further detail above. Thermal conduit may be configured to at least a passage. The plurality of passage can include any at least a passage as described in further detail above. The plurality of passage is configured to have a hollow shape comprising one or more sides, at least two ends (e.g. a top and a bottom), and a length, wherein the hollow shape comprises a void having a shape the same as or different from the shape of the plurality of passage and terminating at an opposite, opposing second end of the shape, as described above in further detail above. For example and without limitation, in the illustrative embodiment, the plurality of passage comprise a rectangle shaped tubular shape. In embodiments, the tubular component runs effectively perpendicular to each battery cell and/or curvature of thermal conduit configured to house each battery cell. In embodiments, the plurality of passage can be disposed such that it forms a void originating at a first side of the battery module and terminating at the second, opposite, and opposing side, of the battery module, as described in further detail in the entirety of this disclosure. According to embodiments, the plurality of passage and/or thermal conduit may be composed utilizing any suitable material, as described in further detail above. In embodiments, the plurality of passage may be disposed in the thermal conduit such that the plurality of passage may be configured to allow the travel of a media from a first end of thermal conduit to the second, opposite, and opposite end of thermal conduit, as described in further detail in the entirety of this disclosure.

Figure 4:
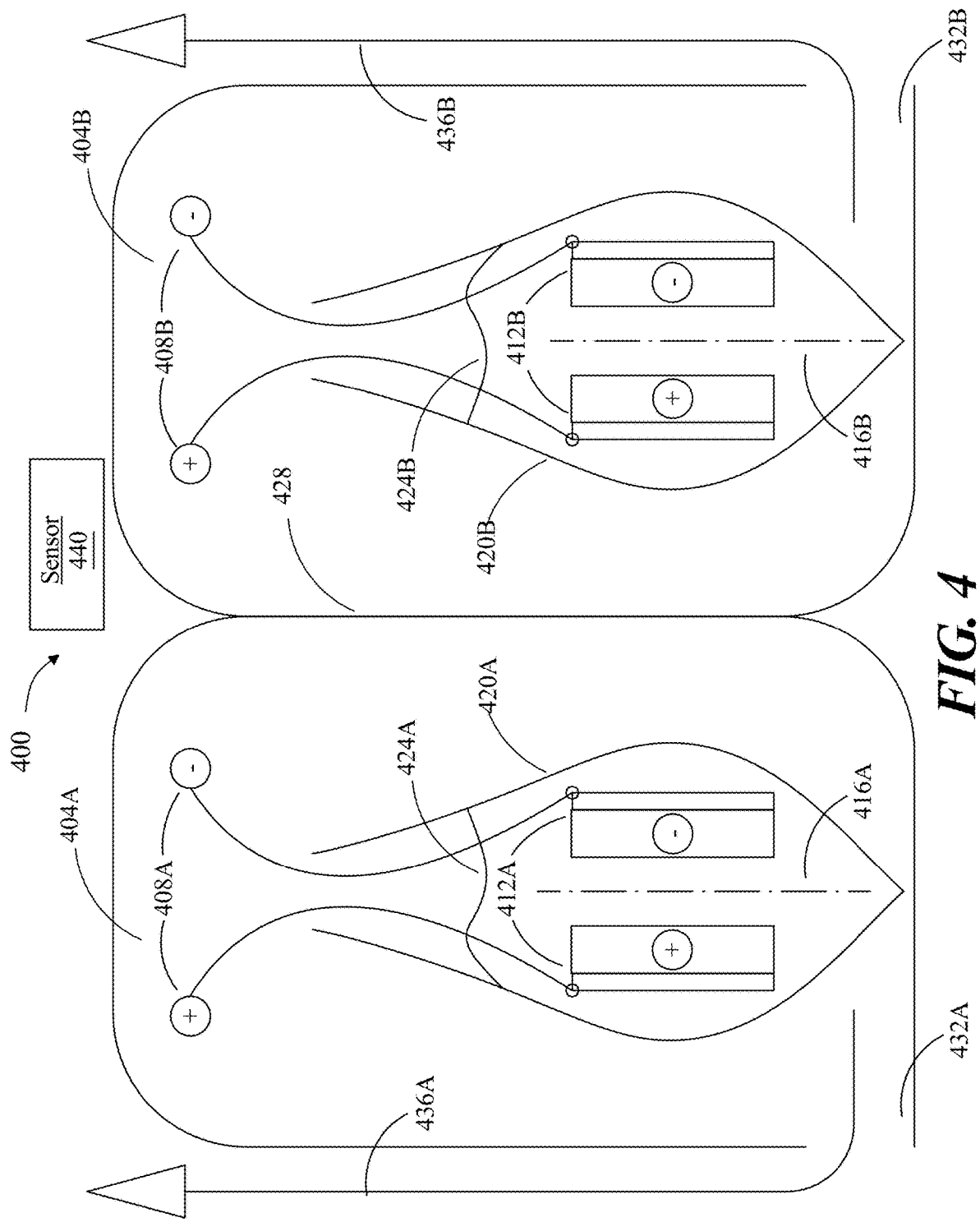
FIG. 4 is a diagram of an exemplary battery pack for preventing progression of thermal runaway between modules.

Referring now to FIG. 4, FIG. 4 illustrates a block diagram of an exemplary battery pack 400 for preventing progression of thermal runaway between modules. Battery pack 400 may include a pouch cell 404A-B. As used in this disclosure, "pouch cell" is a battery cell or module that includes a pouch. In some cases, a pouch cell may include or be referred to as a prismatic pouch cell, for example when an overall shape of pouch is prismatic. In some cases, a pouch cell may include a pouch which is substantially flexible. Alternatively or additionally, in some cases, pouch may be substantially rigid. Pouch cell 404A-B may include at least a pair of electrodes 408A-B. At least a pair of electrodes 408A-B may include a positive electrode and a negative electrode. Each electrode of at least a pair of electrodes 408A-B may include an electrically conductive element. Non-limiting exemplary electrically conductive elements include braided wire, solid wire, metallic foil, circuitry, such as printed circuit boards, and the like. At least a pair of electrodes 408A-B may be in electric communication with and/or electrically connected to at least a pair of foil tabs 412A-B. At least a pair of electrodes 408A-B may be bonded in electric communication with and/or electrically connected to at least a pair of foil tabs 412A-B by any known method, including without limitation welding, brazing, soldering, adhering, engineering fits, electrical connectors, and the like. In some cases, at least a pair of foil tabs may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. A pouch cell 404A-B may include an insulator layer 416A-B. As used in this disclosure, an "insulator layer" is an electrically insulating material that is substantially permeable to battery ions, such as without limitation lithium ions. In some cases, insulator layer may be referred to as a separator layer or simply separator. In some cases, insulator layer 416A-B is configured to prevent electrical communication directly between at least a pair of foil tabs 412A-B (e.g., cathode and anode). In some cases, insulator layer 416A-B may be configured to allow for a flow ion across it. Insulator layer 416A-B may consist of a polymer, such as without limitation polyolifine (PO). Insulator layer 416A-B may comprise pours which are configured to allow for passage of ions, for example lithium ions. In some cases, pours of a PO insulator layer 416A-B may have a width no greater than 100 μm, 10 μm, 1 μm, or 0.1 μm. In some cases, a PO insulator layer 416A-B may have a thickness within a range of 1-100 μm, or 10-50 μm.

Still referring to FIG. 4, pouch cell 404A-B may include a pouch 420A-B. Pouch 420A-B may be configured to substantially encompass at least a pair of foil tabs 412A-B and at least a portion of insulator layer 416A-B. In some cases, pouch 420A-B may include a polymer, such as without limitation polyethylene, acrylic, polyester, and the like. In some case, pouch 420A-B may be coated with one or more coatings. For example, in some cases, pouch may have an outer surface coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (insulation), and the like. An electrolyte 424A-B is located within pouch. In some cases, electrolyte 424A-B may comprise a liquid, a solid, a gel, a paste, and/or a polymer. Electrolyte may wet or contact one or both of at least a pair of foil tabs 412A-B.

Still referring to FIG. 4, battery pack 400 may additionally include an ejecta barrier 428. Ejecta barrier may be located substantially between a first pouch cell 404A and a second pouch cell 404B. As used in this disclosure, an "ejecta barrier" is any material or structure that is configured to substantially block, contain, or otherwise prevent passage of ejecta. As used in this disclosure, "ejecta" is any material that has been ejected, for example from a battery cell. In some cases, ejecta may be ejected during thermal runaway of a battery cell. Alternatively or additionally, in some cases, eject may be ejected without thermal runaway of a battery cell. In some cases, ejecta may include lithium-based compounds. Alternatively or additionally, ejecta may include carbon-based compounds, such as without limitation carbonate esters. Ejecta may include matter in any phase or form, including solid, liquid, gas, vapor, and the like. In some cases, ejecta may undergo a phase change, for example ejecta may be vaporous as it is initially being ejected and then cool and may condense into a solid or liquid after ejection. In some cases, ejecta barrier may be configured to prevent materials ejected from a first pouch cell 404A from coming into contact with a second pouch cell 404B. For example, in some instances ejecta barrier 428 is substantially impermeable to ejecta from battery pouch cell 404A-B. In some embodiments, ejecta barrier 428 may include titanium. In some embodiments, ejecta barrier 428 may include carbon fiber. In some cases, ejecta barrier 428 may include at least a one of a lithiophilic or a lithiophobic material or layer, configured to absorb and/or repel lithium-based compounds. In some cases, ejecta barrier 428 may comprise a lithiophilic metal coating, such as silver or gold. In some cases, ejecta barrier 428 may be flexible and/or rigid. In some cases, ejecta barrier 428 may include a sheet, a film, a foil, or the like. For example in some cases, ejecta barrier may be between 25 and 5,000 micrometers thick. In some cases, an ejecta barrier may have a nominal thickness of about 2 mm. Alternatively or additionally, in some cases, an ejecta barrier may include rigid and/or structural elements, for instance which are solid. Rigid ejecta barriers 428 may include metals, composites and the like. In some cases, ejecta barrier 428 may be further configured to structurally support at least a pouch cell 428. For example in some cases, at least a pouch cell 428 may be mounted to a rigid ejecta barrier 428.

Still referring to FIG. 4, battery pack 400 may additionally include at least a vent 432A-B. In some cases, at least a vent 432A may be configured to vent ejecta from first pouch cell 404A. In some cases, at least a vent 404A may be configured to vent ejecta along a flow path 436A. A flow path 436A may substantially exclude second pouch cell 404B, for example fluids such as gases liquids, or any material that acts as a gas or liquid, flowing along the flow path 436A may be cordoned away from contact with second pouch cell 404B. For example flow path 436A may be configured to not intersect with any surface of second pouch cell 404B. Flow path 436A-B may include any channel, tube, hose, conduit, or the like suitable for facilitating fluidic communication, for example with a pouch cell 404A-B. In some cases, flow path 436A-B may include a check valve. As used in this disclosure, a "check valve" is a valve that permits flow of a fluid only in certain, for example one, direction. In some cases check valve may be configured to allow flow of fluids substantially only away from battery pouch cell 404A-B, while preventing back flow of vented fluid to the battery pouch cell 404A-B. In some cases, check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. According to some embodiments, vent 432A-B may have a vacuum applied to aid in venting of ejecta. Vacuum pressure differential may range from 0.1" Hg to 36" Hg.

Still referring to FIG. 4, battery pack 400 may include a first battery pouch cell 404A and a second battery pouch cell 404B. First pouch cell 404A may include at least a first pair of electrodes 408A, at least a first pair of foil tabs 412A in electrical communication with the first electrodes 408A, at least a first insulator layer 416A located substantially between the plurality of first pair of foil tabs 412A, a first pouch 420A substantially encompassing the plurality of first pair of foil tabs 412A and at least a portion of the plurality of first separator layer 416A, and a first electrolyte 424A within the first pouch 420A. Second pouch cell 404B may include at least a second pair of electrodes 408B, at least a second pair of foil tabs 412B in electrical communication with the first electrodes 408B, at least a second insulator 416B located substantially between the plurality of first pair of foil tabs 412B, a second pouch 420B substantially encompassing the plurality of second pair of foil tabs 412B and at least a portion of the plurality of second insulator 416B, and a second electrolyte 424B within the second pouch 420B. Battery pack 400 may include an ejecta barrier 428 located substantially between first pouch cell 404A and second pouch cell 404B. Ejecta barrier 428 may be substantially impermeable to ejecta, for example ejecta from first pouch cell 404A. In some cases, battery pack 400 may include a vent configured to vent ejecta, for example from first pouch cell 404A. In some embodiments, ejecta barrier 428 may substantially encapsulate at least a portion of pouch cell 404A-B. For example, ejecta barrier 428 may substantially encapsulate first pouch cell 404A. In some cases, vent may be configured to provide fluidic communication through at least one of ejecta barrier 428 and pouch 420A-B. In some cases, vent may include a seam. Seam may be a seam of pouch 420A-B. Alternatively or additionally; seam may be a seam of ejecta barrier 428.

Still referring to FIG. 4, in some embodiments battery pack 400 may additionally include a third pouch cell. Third pouch cell may include at least a third pair of electrodes, at least a third pair of foil tabs welded to the third electrodes, at least a third insulator layer located substantially between the plurality of third pair of foil tabs, a third pouch substantially encompassing the plurality of third pair of foil tabs and the plurality of third separator layer, and a third electrolyte within the third pouch. Battery pack may include a plurality including any number of pouch cells. In some cases, each pouch cell of plurality of pouch cells is separated from adjacent pouch cells with at least an ejecta barrier 428. Any pouch cell of plurality of pouch cells in battery pack may include any component described in this disclosure, for example without limitation vents, valves, and the like.

Still referring to FIG. 4, in some embodiments, pouch cells 404A-B may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Pouch cells 404A-B may include lead-based batteries such as without limitation lead acid batteries and lead carbon batteries. Pouch cells 404A-B may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. Persons skilled in the art, upon reviewing the entirety of this disclosure, will be aware of various devices of components that may be used as a battery module. In some cases, battery pack 400 is constructed in a manner that vents ejecta, while preventing ejecta from one pouch cell from interacting with another pouch cell.

Still referring to FIG. 4, battery pack 400 may include at least a sensor 440. At least a sensor 440 may include a sensor suite, for example as described above. In some cases, at least a sensor 440 may be configured to sense battery pack data and transmit battery pack data to a data storage system, for example as described above.

Figure 5:
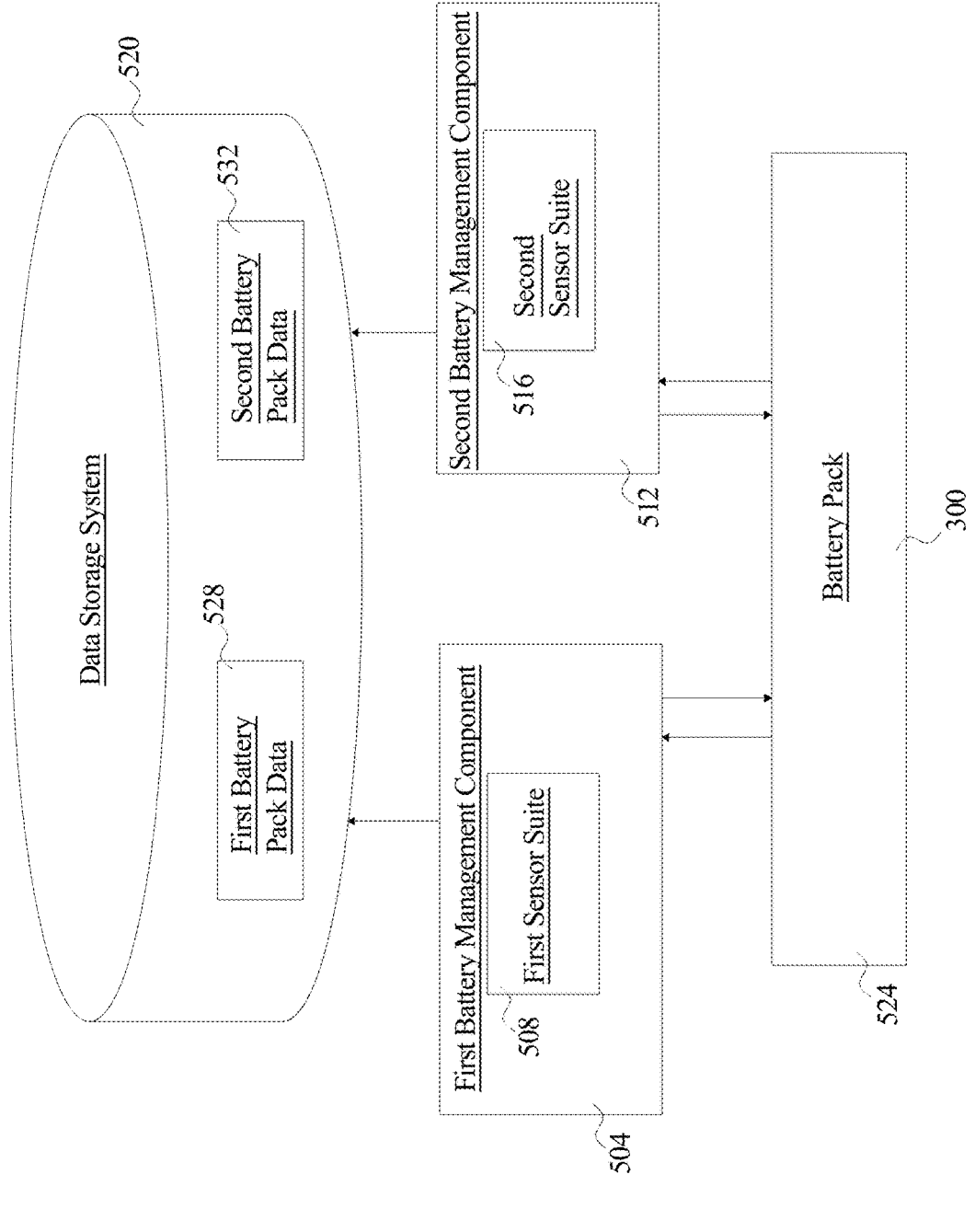
FIG. 5 is a block diagram of an embodiment of battery management system.

Referring now to FIG. 5, an embodiment of battery management system 500 is presented. Battery management system 500 is integrated in a battery pack configured for use in an electric aircraft. The battery management system 500 is integrated in a portion of the battery pack or subassembly thereof, which will be disclosed with further detail with reference to FIGS. 4-6. Battery management system 500 includes first battery management component 504 disposed on a first end of the battery pack. One of ordinary skill in the art will appreciate that there are various areas in and on a battery pack and/or subassemblies thereof that may include first battery management component 504. First battery management component 504 may take any suitable form. In a non-limiting embodiment, first battery management component 504 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management component 504 may be soldered or otherwise electrically connected to a circuit board. First battery management component may be disposed directly over, adjacent to, facing, and/or near a battery module and specifically at least a portion of a battery cell. First battery management component 504 includes first sensor suite 508. First sensor suite 508 is configured to measure, detect, sense, and transmit first plurality of battery pack data 528 to data storage system 520, which will be disclosed in further detail with reference to FIG. 9.

Still referring to FIG. 5, battery management system 500 includes second battery management component 512. Second battery management component 512 is disposed in or on a second end of battery pack 524. Second battery management component 512 includes second sensor suite 516. Second sensor suite 516 may be consistent with the description of any sensor suite disclosed herein. Second sensor suite 516 is configured to measure second plurality of battery pack data 532. Second plurality of battery pack data 532 may be consistent with the description of any battery pack data disclosed herein. Second plurality of battery pack data 532 may additionally include data not measured or recorded in another section of battery management system 500. Second plurality of battery pack data 532 may be communicated to additional or alternate systems to which it is communicatively coupled. Second sensor suite 516 includes a moisture sensor consistent with any moisture sensor disclosed herein, namely moisture sensor 804.

Still referring to FIG. 5, first battery management component 504 disposed in or on battery pack 524 may be physically isolated from second battery management component 512 also disposed on or in battery pack 524. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. First battery management component 504 and second battery management component 508 may perform the same or different functions in battery management system 500. In a non-limiting embodiment, the first and second battery management components perform the same, and therefore redundant functions. If, for example, first battery management component 504 malfunctions, in whole or in part, second battery management component 508 may still be operating properly and therefore battery management system 500 may still operate and function properly for electric aircraft in which it is installed. Additionally or alternatively, second battery management component 508 may power on while first battery management component 504 is malfunctioning. One of ordinary skill in the art would understand that the terms "first" and "second" do not refer to either "battery management components" as primary or secondary. In non-limiting embodiments, first battery management component 504 and second battery management component 508 may be powered on and operate through the same ground operations of an electric aircraft and through the same flight envelope of an electric aircraft. This does not preclude one battery management component, first battery management component 504, from taking over for second battery management component 508 if it were to malfunction. In non-limiting embodiments, the first and second battery management components, due to their physical isolation, may be configured to withstand malfunctions or failures in the other system and survive and operate. Provisions may be made to shield first battery management component 504 from second battery management component 508 other than physical location such as structures and circuit fuses. In non-limiting embodiments, first battery management component 504, second battery management component 508, or subcomponents thereof may be disposed on an internal component or set of components within battery pack 524, such as on battery module sense board.

Still referring to FIG. 5, first battery management component 504 may be electrically isolated from second battery management component 508. "Electrical isolation", for the purposes of this disclosure, refers to a first system's separation of components carrying electrical signals or electrical energy from a second system's components. First battery management component 504 may suffer an electrical catastrophe, rendering it inoperable, and due to electrical isolation, second battery management component 508 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

Still referring to FIG. 5, battery management system 500 includes data storage system 520. Data storage system 520 is configured to store first plurality of battery pack data 528 and second plurality of battery pack data 532. Data storage system 520 may include a database. Data storage system 520 may include a solid-state memory or tape hard drive. Data storage system 520 may be communicatively coupled to first battery management component 504 and second battery management component 512 and may be configured to receive electrical signals related to physical or electrical phenomenon measured and store those electrical signals as first battery pack data 528 and second battery pack data 532, respectively. Alternatively, data storage system 520 may include more than one discrete data storage systems that are physically and electrically isolated from each other. In this non-limiting embodiment, each of first battery management component 504 and second battery management component 512 may store first battery pack data 528 and second battery pack data 532 separately. One of ordinary skill in the art would understand the virtually limitless arrangements of data stores with which battery management system 500 could employ to store the first and second plurality of battery pack data.

Still referring to FIG. 5, data storage system 520 stores first plurality of battery pack data 528 and second plurality of battery pack data 532. First plurality of battery pack data 528 and second plurality of battery pack data 532 may include total flight hours that battery pack 524 and/or electric aircraft have been operating. The first and second plurality of battery pack data may include total energy flowed through battery pack 524. Data storage system 520 may be communicatively coupled to sensors that detect, measure and store energy in a plurality of measurements which may include current, voltage, resistance, impedance, coulombs, watts, temperature, or a combination thereof. Additionally or alternatively, data storage system 520 may be communicatively coupled to a sensor suite consistent with this disclosure to measure physical and/or electrical characteristics. Data storage system 520 may be configured to store first battery pack data 528 and second battery pack data 532 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Data storage system 520 may store the first and second battery pack data that includes an upper voltage threshold and lower voltage threshold consistent with this disclosure. First battery pack data 528 and second battery pack data 532 may include a moisture level threshold. The moisture level threshold may include an absolute, relative, and/or specific moisture level threshold. Battery management system 500 may be designed to the Federal Aviation Administration (FAA)'s Design Assurance Level A (DAL-A), using redundant DAL-B subsystems.

Figure 6:
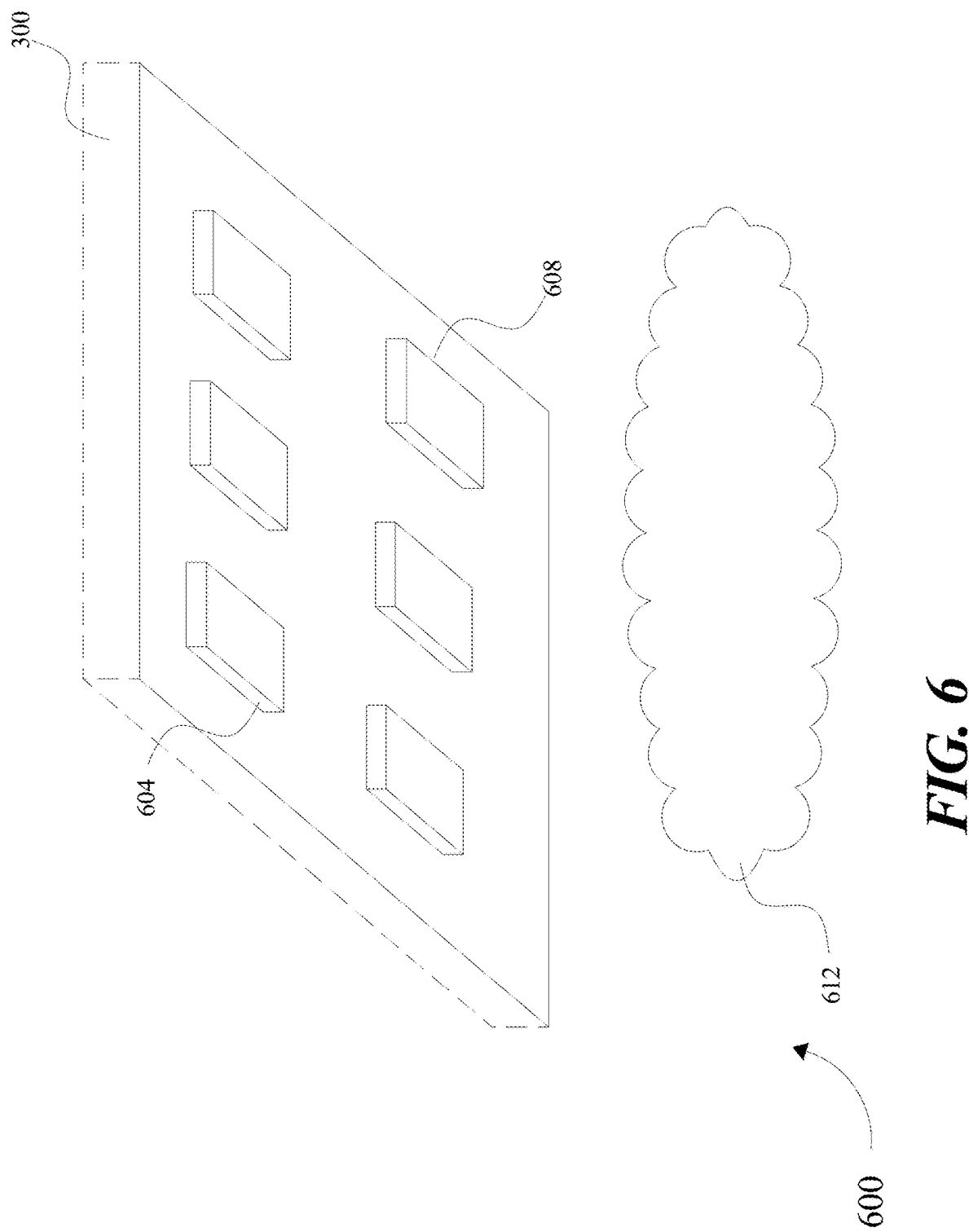
FIG. 6 is an illustration of a sensor suite in partial cut-off view.

Referring now to FIG. 6, an embodiment of sensor suite 600 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery management system 500 and/or user to detect phenomenon is maintained and in a non-limiting example, a user alter aircraft usage pursuant to sensor readings.

Still referring to FIG. 6, in some embodiments, sensor suite 600 may be suitable for use as first sensor suite 504 and/or second sensor suite 516. Sensor suite 600 includes a moisture sensor 604. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 604 may be psychrometer. Moisture sensor 604 may be a hygrometer. Moisture sensor 604 may be configured to act as or include a humidistat. A "humidistat", for the purposes of this disclosure, is a humidity-triggered switch, often used to control another electronic device. Moisture sensor 604 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

Still referring to FIG. 6, in some embodiments, sensor suite 600 may include electrical sensors 608. Electrical sensors 608 may be configured to measure voltage across a component, electrical current through a component, and resistance of a component. Electrical sensors 608 may include separate sensors to measure each of the previously disclosed electrical characteristics such as voltmeter, ammeter, and ohmmeter, respectively.

Still referring to FIG. 6, alternatively or additionally, sensor suite 600 include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 600 and/or a control circuit incorporated therein and/or communicatively connected thereto may be configured to adjust charge to one or more battery cells as a function of a charge level and/or a detected parameter. For instance, and without limitation, sensor suite 600 may be configured to determine that a charge level of a battery cell is high based on a detected voltage level of that battery cell or portion of the battery pack. Sensor suite 600 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 600 may include digital sensors, analog sensors, or a combination thereof. Sensor suite 600 may include digital-to-analog converters (DAC), analog-to-digital converters (ADC, A/D, A-to-D), a combination thereof, or other signal conditioning components used in transmission of a first plurality of battery pack data 128 to a destination over wireless or wired connection.

Still referring to FIG. 6, in some embodiments, sensor suite 600 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure 612 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 600, may be configured to detect combustible, flammable, toxic, oxygen depleted, a combination thereof, or another type of gas alone or in combination. The gas sensor that may be present in sensor suite 600 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 600 may include sensors that are configured to detect non-gaseous byproducts of cell failure 612 including, in non-limiting examples, liquid chemical leaks including aqueous alkaline solution, ionomer, molten phosphoric acid, liquid electrolytes with redox shuttle and ionomer, and salt water, among others. Sensor suite 600 may include sensors that are configured to detect non-gaseous byproducts of cell failure 612 including, in non-limiting examples, electrical anomalies as detected by any of the previous disclosed sensors or components.

Still referring to FIG. 6, in some embodiments, sensor suite 600 may be configured to detect events where voltage nears an upper voltage threshold or lower voltage threshold. The upper voltage threshold may be stored in data storage system 520 for comparison with an instant measurement taken by any combination of sensors present within sensor suite 600. The upper voltage threshold may be calculated and calibrated based on factors relating to battery cell health, maintenance history, location within battery pack, designed application, and type, among others. Sensor suite 600 may measure voltage at an instant, over a period of time, or periodically. Sensor suite 600 may be configured to operate at any of these detection modes, switch between modes, or simultaneous measure in more than one mode. First battery management component 504 may detect through sensor suite 600 events where voltage nears the lower voltage threshold. The lower voltage threshold may indicate power loss to or from an individual battery cell or portion of the battery pack. First battery management component 504 may detect through sensor suite 600 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

Figure 7:
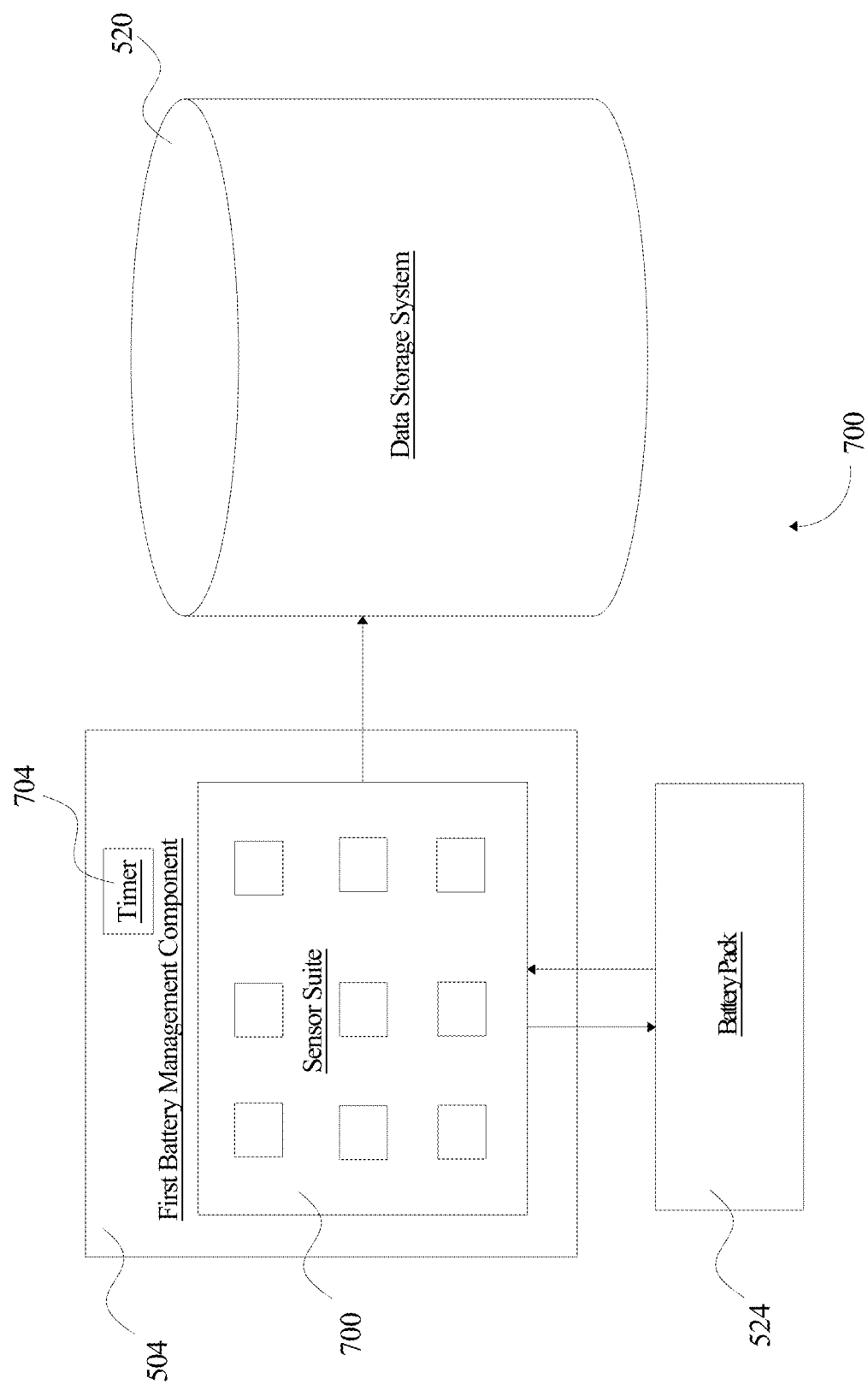
FIG. 7 is a block diagram illustrating a data collection system.

Referring now to FIG. 7, a block diagram of data collection system 700 is presented. Data collection system 700 includes sensor suite 600, which may be used for first sensor suite 508 in first battery management component 504 or second sensor suite 516 in second battery management component 512 or consistent with any sensor suite disclosed hereinabove. Data collection system 700 includes data storage system 520. Sensor suite 600 is configured to measure physical and/or electrical phenomena and characteristics of battery pack 524, in whole or in part. Sensor suite 600 then transmits electrical signals to data storage system 520 to be saved. Those electrical signals are representative of first battery pack data 528 and second battery pack data 532. The electrical signals communicated from sensor suite 600, and moreover from the first or second battery management component to which it belongs may be transformed or conditioned consistent with any signal conditioning present in this disclosure. Data collection system 700 and more specifically first battery management component 504, may be configured to save first battery pack data 528 and second battery pack data 532 periodically in regular intervals to data storage system 520. "Regular intervals", for the purposes of this disclosure, refers to an event taking place repeatedly after a certain amount of elapsed time. Data collection system 700 may include first battery management component 504, which may include timer 704. Timer 704 may include a timing circuit, internal clock, or other circuit, component, or part configured to keep track of elapsed time and/or time of day. For example, in non-limiting embodiments, data storage system 520 may save the first and second battery pack data every 30 seconds, every minute, every 30 minutes, or another time period according to timer 704. Additionally or alternatively, data storage system 520 may save the first and second battery pack data after certain events occur, for example, in non-limiting embodiments, each power cycle, landing of the electric aircraft, when battery pack is charging or discharging, or scheduled maintenance periods. In non-limiting embodiments, battery pack 524 phenomena may be continuously measured and stored at an intermediary storage location, and then permanently saved by data storage system 520 at a later time, like at a regular interval or after an event has taken place as disclosed hereinabove. Additionally or alternatively, data storage system may be configured to save first battery pack data 528 and second battery pack data 532 at a predetermined time. "Predetermined time", for the purposes of this disclosure, refers to an internal clock within battery management system 500 commanding data storage system 520 to save the first and second battery pack data at that time. For example, data storage system 520 may be configured to save the first and second battery pack data at 0600 hours, 51 P.M. EDT, or another time or multiple times a day.

Figure 8:
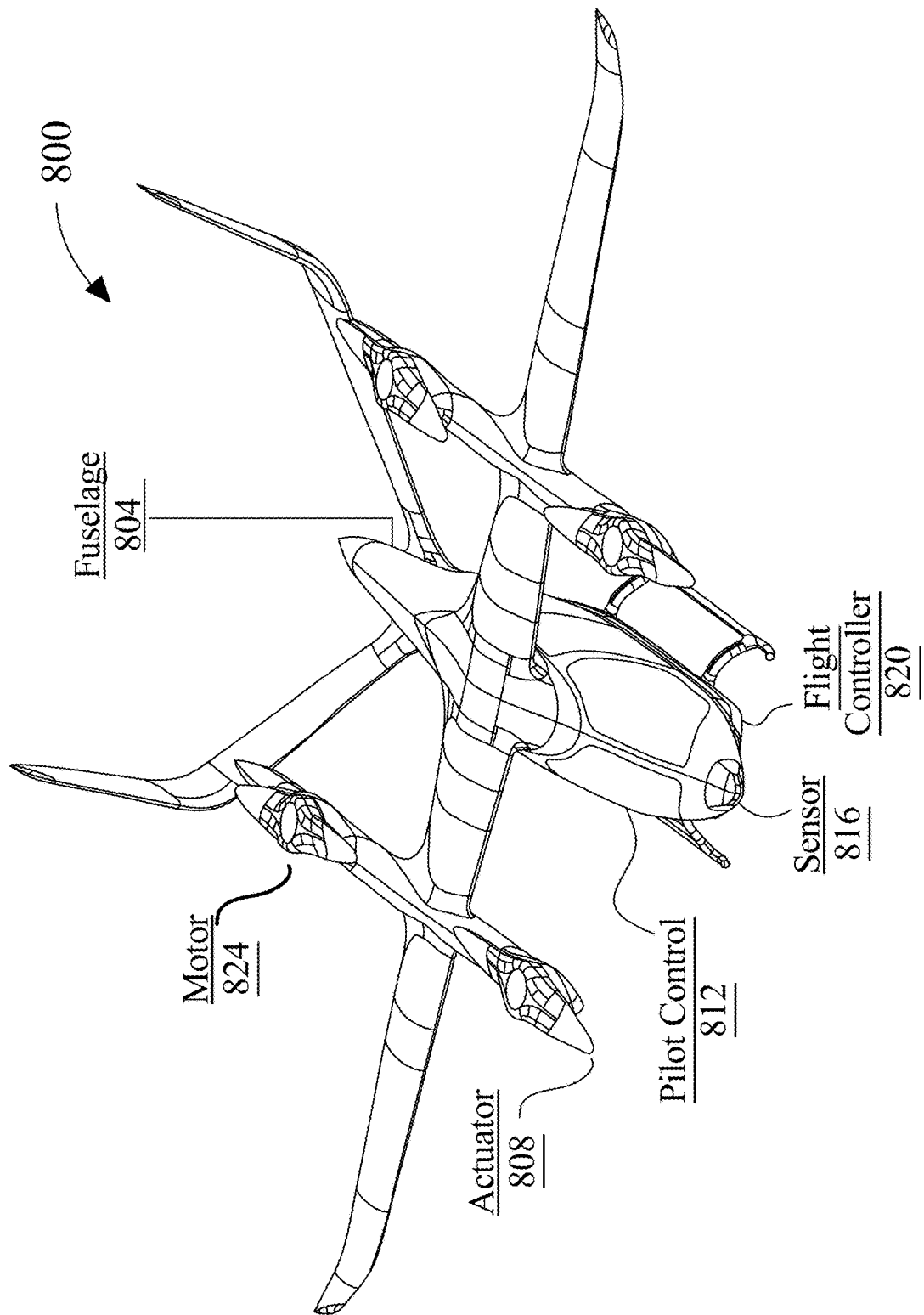
FIG. 8 is an illustration of an embodiment of an electric aircraft.

Referring now to FIG. 8, an exemplary embodiment of an aircraft 800 is illustrated. Aircraft 800 may include an electrically powered aircraft (i.e., electric aircraft). In some embodiments, electrically powered aircraft may be an electric vertical takeoff and landing (eVTOL) aircraft. In some embodiments, aircraft 800 may include a fuselage 804. Fuselage 804 may comprise structural elements that physically support the shape and structure of an aircraft. Structural elements may take a plurality of forms, alone or in combination with other types. Structural elements may vary depending on the construction type of aircraft and specifically, the fuselage. Fuselage 804 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 8, aircraft 800 may include a plurality of actuators 808. Actuator 808 may include any motor and/or propulsor described in this disclosure. In an embodiment, actuator 808 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 8, a plurality of actuators 808 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 808 may include a component used to produce a torque that affects aircrafts' roll and pitch, such as without limitation one or more ailerons. An "aileron," as used in this disclosure, is a hinged surface which forms part of the trailing edge of a wing in a fixed wing aircraft, and which may be moved via mechanical means such as without limitation servomotors, mechanical linkages, or the like. As a further example, plurality of actuators 808 may include a rudder, which may include, without limitation, a segmented rudder that produces a torque about a vertical axis. Additionally or alternatively, plurality of actuators 808 may include other flight control surfaces such as propulsors, rotating flight controls, or any other structural features which can adjust movement of aircraft 800. Plurality of actuators 808 may include one or more rotors, turbines, ducted fans, paddle wheels, and/or other components configured to propel a vehicle through a fluid medium including, but not limited to air.

Still referring to FIG. 8, plurality of actuators 808 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As a non-limiting example, pusher component may include a pusher component such as a pusher propeller, a pusher motor, a pusher propulsor, and the like. Additionally, or alternatively, pusher flight component may include a plurality of pusher flight components.

Still referring to FIG. 8, in another embodiment, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 8, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 8, plurality of actuators 808 may include power sources, control links to one or more elements, fuses, and/or mechanical couplings used to drive and/or control any other flight component. Plurality of actuators 808 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 8, plurality of actuators 808 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

Still referring to FIG. 8, in another embodiment, an energy source may be used to provide a steady supply of electrical power to a load over a flight by an electric aircraft 800. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 8, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 8, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 8, another exemplary actuator may include landing gear. Landing gear may be used for take-off and/or landing/Landing gear may be used to contact ground while aircraft 800 is not in flight. Exemplary landing gear is disclosed in detail in U.S. Patent application Ser. No. 17/196,719 entitled "SYSTEM FOR ROLLING LANDING GEAR" by R. Griffin et al., which is incorporated in its entirety herein by reference.

Still referring to FIG. 8, aircraft 800 may include a pilot control 812, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 808. For example and without limitation, collective control may alter and/or adjust the pitch angle of all of the main rotor blades collectively. For example, and without limitation pilot control 812 may include a yoke control. As used in this disclosure a "yoke control" is a mechanical control of an aircraft to control the pitch and/or roll. For example and without limitation, yoke control may alter and/or adjust the roll angle of aircraft 800 as a function of controlling and/or maneuvering ailerons. In an embodiment, pilot control 812 may include one or more footbrakes, control sticks, pedals, throttle levels, and the like thereof. In another embodiment, and without limitation, pilot control 812 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 800 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 800 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 8, pilot control 812 may be configured to modify a variable pitch angle. For example, and without limitation, pilot control 812 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 812 may modify the variable pitch angle from a first angle of 2.71° to a second angle of 3.52°. Additionally or alternatively, pilot control 812 may be configured to translate a pilot desired torque for flight component 808. For example, and without limitation, pilot control 812 may translate that a pilot's desired torque for a propeller be 160 lb. ft. of torque. As a further non-limiting example, pilot control 812 may introduce a pilot's desired torque for a propulsor to be 290 lb. ft. of torque. Additional disclosure related to pilot control 812 may be found in U.S. patent application Ser. Nos. 17/001,545 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 8, aircraft 800 may include a loading system. A loading system may include a system configured to load an aircraft of either cargo or personnel. For instance, some exemplary loading systems may include a swing nose, which is configured to swing the nose of aircraft 800 of the way thereby allowing direct access to a cargo bay located behind the nose. A notable exemplary swing nose aircraft is Boeing 747. Additional disclosure related to loading systems can be found in U.S. Patent application Ser. No. 17/87,594 entitled "SYSTEM AND METHOD FOR LOADING AND SECURING PAYLOAD IN AN AIRCRAFT" by R. Griffin et al., entirety of which in incorporated herein by reference.

Still referring to FIG. 8, aircraft 800 may include a sensor 816. Sensor 816 may include any sensor or noise monitoring circuit described in this disclosure. 816 may be configured to sense a characteristic of pilot control 812. Sensor may be a device, module, and/or subsystem, utilizing any hardware, software, and/or any combination thereof to sense a characteristic and/or changes thereof, in an instant environment, for instance without limitation a pilot control 812, which the sensor is proximal to or otherwise in a sensed communication with, and transmit information associated with the characteristic, for instance without limitation digitized data. Sensor 816 may be mechanically and/or communicatively coupled to aircraft 800, including, for instance, to at least a pilot control 812. Sensor 816 may be configured to sense a characteristic associated with at least a pilot control 812. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 816 may include at least a geospatial sensor. Sensor 816 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 800 for both critical and non-critical functions. Sensor may be incorporated into vehicle or aircraft or be remote.

Still referring to FIG. 8, in some embodiments, sensor 816 may be configured to sense a characteristic associated with any pilot control described in this disclosure. Non-limiting examples of a sensor 816 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 816 may sense a characteristic as an analog measurement, for instance, yielding a continuously variable electrical potential indicative of the sensed characteristic. In these cases, sensor 816 may additionally comprise an analog to digital converter (ADC) as well as any additional circuitry, such as without limitation a Whetstone bridge, an amplifier, a filter, and the like. For instance, in some cases, sensor 816 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 800, for instance without limitation a computing system, a pilot display, and a memory component. Alternatively or additionally, sensor 816 may sense a characteristic of a pilot control 812 digitally. For instance in some embodiments, sensor 816 may sense a characteristic through a digital means or digitize a sensed signal natively. In some cases, for example, sensor 816 may include a rotational encoder and be configured to sense a rotational position of a pilot control; in this case, the rotational encoder digitally may sense rotational "clicks" by any known method, such as without limitation magnetically, optically, and the like.

Still referring to FIG. 8, electric aircraft 800 may include at least a motor 824, which may be mounted on a structural feature of the aircraft. Design of motor 824 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 824 may include two main holes in top and bottom of mounting area to access bearing cartridge. Further, a structural feature may include a component of electric aircraft 800. For example, and without limitation structural feature may be any portion of a vehicle incorporating motor 824, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 808. Persons skilled in the art, upon reviewing the entirety of this disclosure, will be aware of various materials, combinations of materials, and/or constructions techniques.

Still referring to FIG. 8, a number of aerodynamic forces may act upon the electric aircraft 800 during flight. Forces acting on electric aircraft 800 during flight may include, without limitation, thrust, the forward force produced by the rotating element of the electric aircraft 800 and acts parallel to the longitudinal axis. Another force acting upon electric aircraft 800 may be, without limitation, drag, which may be defined as a rearward retarding force which is caused by disruption of airflow by any protruding surface of the electric aircraft 800 such as, without limitation, the wing, rotor, and fuselage. Drag may oppose thrust and acts rearward parallel to the relative wind. A further force acting upon electric aircraft 800 may include, without limitation, weight, which may include a combined load of the electric aircraft 800 itself, crew, baggage, and/or fuel. Weight may pull electric aircraft 800 downward due to the force of gravity. An additional force acting on electric aircraft 800 may include, without limitation, lift, which may act to oppose the downward force of weight and may be produced by the dynamic effect of air acting on the airfoil and/or downward thrust from the propulsor 808 of the electric aircraft. Lift generated by the airfoil may depend on speed of airflow, density of air, total area of an airfoil and/or segment thereof, and/or an angle of attack between air and the airfoil. For example, and without limitation, electric aircraft 800 are designed to be as lightweight as possible. Reducing the weight of the aircraft and designing to reduce the number of components is essential to optimize the weight. To save energy, it may be useful to reduce weight of components of electric aircraft 800, including without limitation propulsors and/or propulsion assemblies. In an embodiment, motor 824 may eliminate need for many external structural features that otherwise might be needed to join one component to another component. Motor 824 may also increase energy efficiency by enabling a lower physical propulsor profile, reducing drag and/or wind resistance. This may also increase durability by lessening the extent to which drag and/or wind resistance add to forces acting on electric aircraft 800 and/or propulsors.

Figure 9:
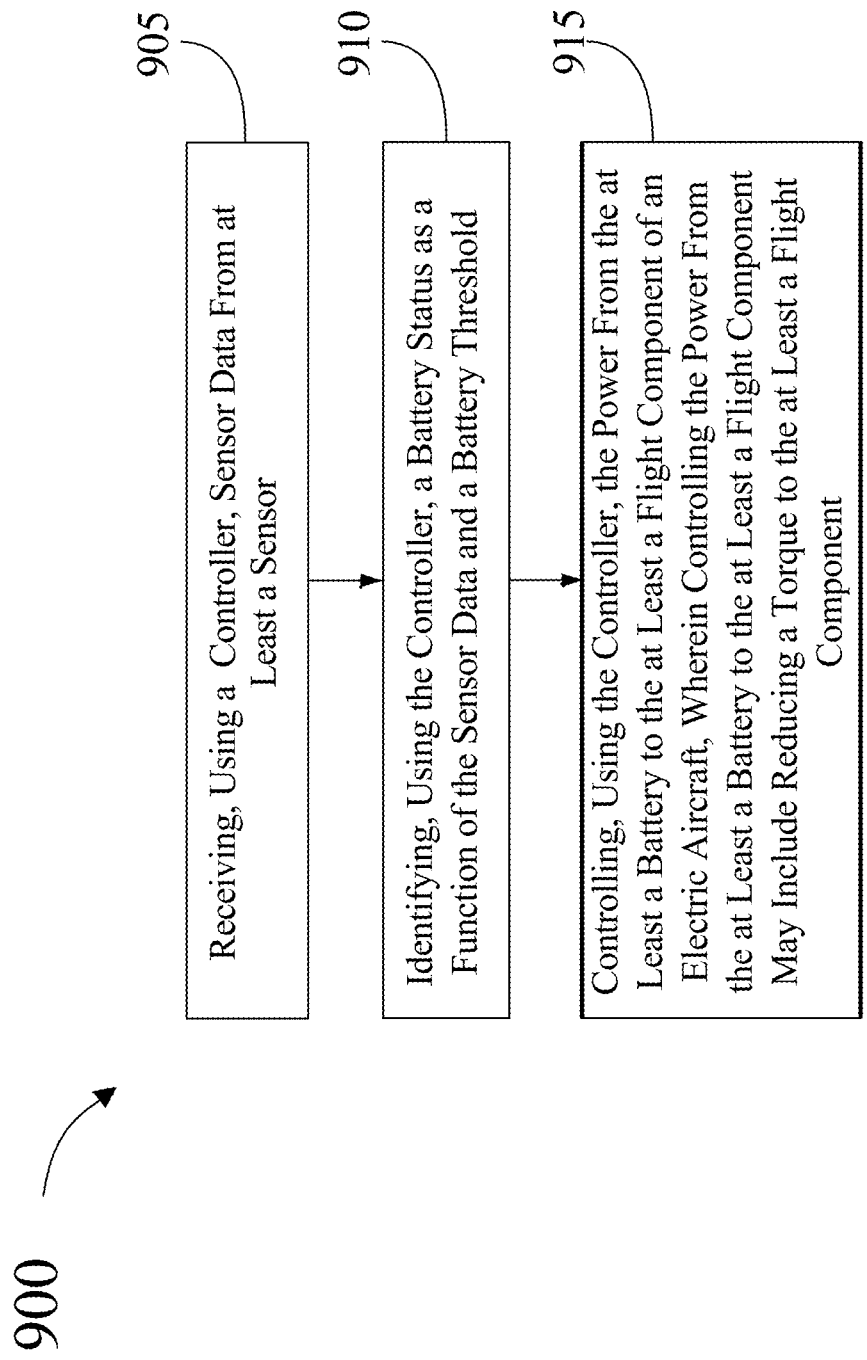
FIG. 9 is a flow diagram of a method for a battery power management system for an electric aircraft.

Referring now to FIG. 9, a flow diagram of a method 900 for a battery power management system for an electric aircraft. The method 900 includes a step 905 of receiving, using a controller, sensor data from at least a sensor communicatively connected to at least a battery configured to provide a power to at least a flight component of an electric aircraft. The method 900 includes a step 910 of identifying, using the controller, a battery status as a function of the sensor data and a battery threshold. In some embodiments, the step 910 of identifying the battery status may further include subtracting the sensor data of the temperature of the at least a battery from the temperature threshold. In some embodiments, the step 910 of identifying the battery status may further include subtracting the sensor data of the temperature of the at least a battery from the temperature threshold. The method 900 includes a step 915 of controlling, using the controller, the power of the at least a battery to the at least a flight component of the electric aircraft as a function of the battery status. In some embodiments, the step 915 of controlling the power from the at least a battery to the at least a flight component may further include reducing, using the controller, revolution per minute (RPM) of the propulsor. In some embodiments, the step 915 of controlling the power from the at least a battery to the at least a flight component may further include reducing, using the controller, a current of the at least a battery.

With continued reference to FIG. 9, in some embodiments, the at least a sensor may include a temperature sensor, and the method 900 may further include detecting, using the at least a sensor, the sensor data, wherein the sensor data comprises a temperature of the at least a battery and transmitting, using the at least a sensor, the temperature of the at least a battery to the controller. In some embodiments, the battery threshold may include a temperature threshold of the at least a battery. In some embodiments, the at least a flight component may include at least a propulsor.

With continued reference to FIG. 9, in some embodiments, the battery status may include a status 0, wherein the sensor datum may be within the battery threshold, and a status 1, wherein the sensor datum may be outside the battery threshold. In some embodiments, the method 900 may further include identifying, using the controller, a status weight and controlling, using the controller, the power of the at least a battery as a function of the status weight. In some embodiments, the flight controller may be communicatively connected to a display device and the method 900 may further include displaying, using the controller, a battery alert to a user on the display device, receiving, using the controller, a user input in response to the battery alert and controlling, using the controller, the power of the at least a battery as a function of the user input. These may be implemented as disclosed with reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
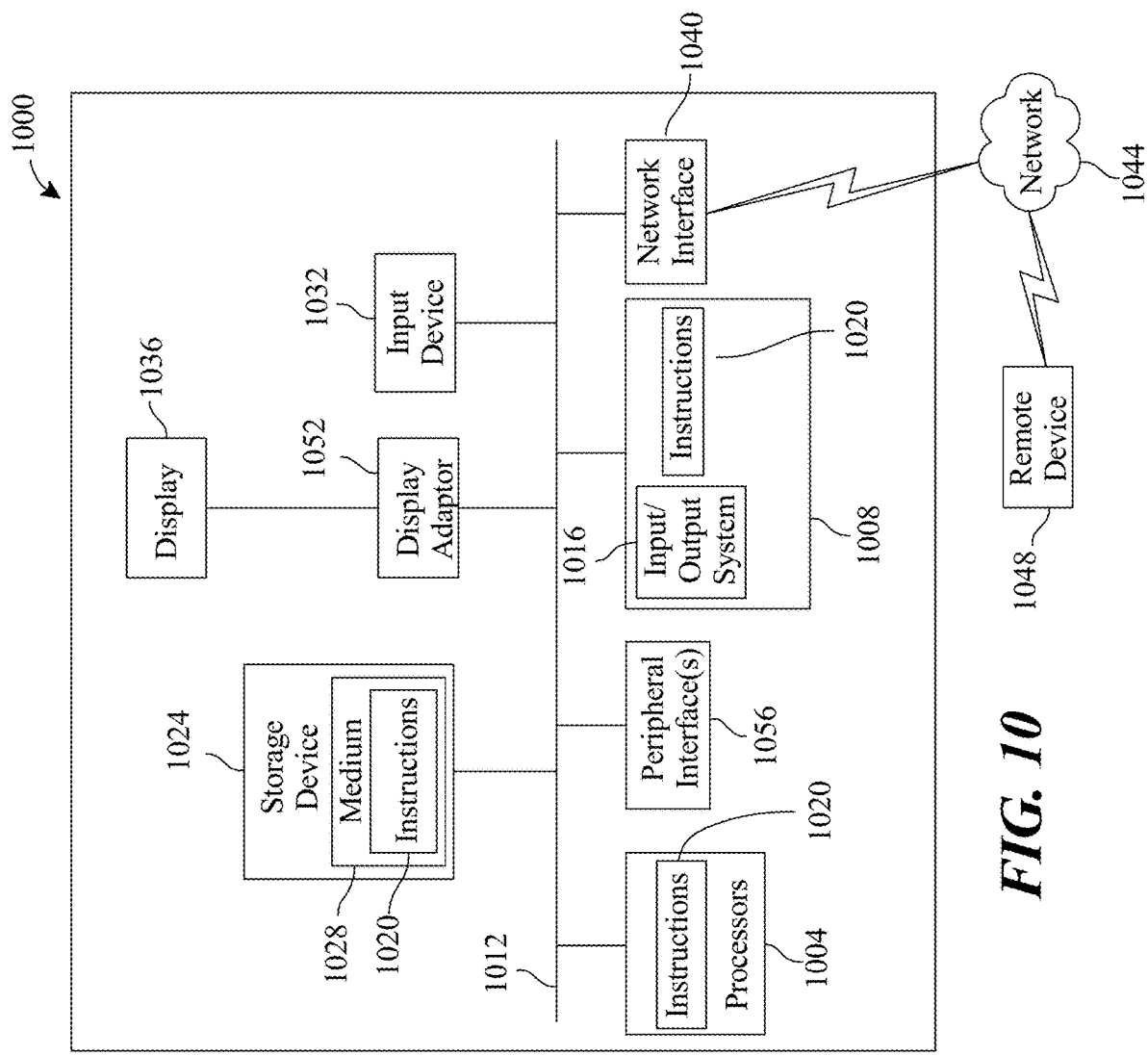
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for a battery power management system for an electric aircraft, wherein the system comprises:
    at least a flight component of an electric aircraft;
    at least a battery, wherein the at least a battery is configured to power the at least a flight component of the electric aircraft;
    at least a sensor communicatively connected to the at least a battery; and
    a controller communicatively connected to the at least a sensor, wherein the controller is configured to:
        receive sensor data from the at least a sensor;
        identify a battery status as a function of the sensor data and a battery threshold; and
        control the power from the at least a battery to the at least a flight component of the electric aircraft as a function of the battery status, wherein controlling the power from the at least a battery to the at least a flight component comprises reducing a torque to the at least a flight component.

2. The system of claim 1, wherein the at least a sensor comprises a temperature sensor, wherein the temperature sensor is configured to:
    detect the sensor data, wherein the sensor data comprises a temperature of the at least a battery; and
    transmit the temperature of the at least a battery to the controller.

3. The system of claim 1, wherein the battery threshold comprises a temperature threshold of the at least a battery.

4. The system of claim 3, wherein identifying the battery status comprises subtracting the sensor data of the temperature of the at least a battery from the temperature threshold.

5. The system of claim 1, wherein the at least a flight component comprises at least a propulsor.

6. The system of claim 5, wherein controlling the power from the at least a battery to the at least a flight component of the electric aircraft further comprises reducing a revolution per minute (RPM) of the propulsor.

7. The system of claim 1, wherein controlling the power from the at least a battery to the at least a flight component of the electric aircraft comprises reducing a current of the at least a battery.

8. The system of claim 1, wherein the battery status comprises:
    a status 0, wherein the sensor datum is within the battery threshold; and
    a status 1, wherein the sensor datum is outside the battery threshold.

9. The system of claim 1, wherein the controller is further configured to:
    identify a status weight; and
    control the power of the at least a battery as a function of the status weight.

10. The system of claim 1, wherein:
    the system further comprises a display device; and
    the controller is further configured to:
        display a battery alert to a user on the display device;
        receive a user input in response to the battery alert; and
        control the power of the at least a battery as a function of the user input.

11. A method for a battery power management system for an electric aircraft, wherein the system comprises:
    receiving, using a controller, sensor data from at least a sensor communicatively connected to at least a battery configured to provide a power to at least a flight component of an electric aircraft;
    identifying, using the controller, a battery status as a function of the sensor data and a battery threshold; and
    controlling, using the controller, the power from the at least a battery to the at least a flight component of the electric aircraft as a function of the battery status, wherein controlling the power from the at least a battery to the at least a flight component comprises reducing a torque to the at least a flight component.

12. The method of claim 11, wherein the at least a sensor comprises a temperature sensor, and the method further comprising:
    detecting, using the at least a sensor, the sensor data, wherein the sensor data comprises a temperature of the at least a battery; and
    transmitting, using the at least a sensor, the temperature of the at least a battery to the controller.

13. The method of claim 11, wherein the battery threshold comprises a temperature threshold of the at least a battery.

14. The method of claim 13, identifying the battery status comprises subtracting the sensor data of the temperature of the at least a battery from the temperature threshold.

15. The method of claim 11, wherein the at least a flight component comprises at least a propulsor.

16. The method of claim 15, wherein controlling the power from the at least a battery to the at least a flight component further comprises reducing, using the controller, revolution per minute (RPM) of the propulsor.

17. The method of claim 11, wherein controlling the power from the at least a battery to the at least a flight component comprises reducing, using the controller, a current of the at least a battery.

18. The method of claim 11, wherein the battery status comprises:
    a status 0, wherein the sensor datum is within the battery threshold; and a status 1, wherein the sensor datum is outside the battery threshold.

19. The method of claim 11, further comprising:
identifying, using the controller, a status weight; and
controlling, using the controller, the power of the at least a battery as a function of the status weight.

20. The method of claim 11, wherein the system further comprises a display device and the method further comprises:
displaying, using the controller, a battery alert to a user on the display device;
receiving, using the controller, a user input in response to the battery alert; and
controlling, using the controller, the power of the at least a battery as a function of the user input.

* * * * *